United States Patent

Horiuchi et al.

[11] Patent Number: 6,043,604
[45] Date of Patent: Mar. 28, 2000

[54] PLASMA DISPLAY WITH BARRIER RIB OF SPECIFIC CONSTRUCTION

[75] Inventors: Ken Horiuchi; Yuichiro Iguchi; Takaki Masaki; Go Moriya, all of Shiga, Japan

[73] Assignee: Toray Industries, Inc., Tokyo, Japan

[21] Appl. No.: 09/029,812

[22] PCT Filed: Jul. 10, 1997

[86] PCT No.: PCT/JP97/02404

§ 371 Date: Mar. 10, 1998

§ 102(e) Date: Mar. 10, 1998

[87] PCT Pub. No.: WO98/01885

PCT Pub. Date: Jan. 15, 1998

[30] Foreign Application Priority Data

| Jul. 10, 1996 | [JP] | Japan | 8-180843 |
| Aug. 30, 1996 | [JP] | Japan | 8-230313 |
| Oct. 30, 1996 | [JP] | Japan | 8-288120 |

[51] Int. Cl.$^7$ .................................................. H01J 17/49
[52] U.S. Cl. ........................................ 313/582; 313/292
[58] Field of Search ........................... 313/582, 238, 313/292

[56] References Cited

U.S. PATENT DOCUMENTS 3,885,195  5/1975  Amano .

FOREIGN PATENT DOCUMENTS 0 554 172 A1  8/1993  European Pat. Off. .

*Primary Examiner*—Vip Patel
*Attorney, Agent, or Firm*—Morrison & Foerster LLP

[57] ABSTRACT

With barrier ribs having a specified form, the strength and the adhesiveness to the substrate board are improved, and a high-resolution plasma display with suppressed meandering, falling and peeling of the barrier rib and wire breakage is provided. In addition, coating uniformity of the phosphor is improved, a high-resolution plasma display with low luminance irregularity is provided. Furthermore, a high-luminance high resolution plasma display with excellent luminance characteristic is provided.

18 Claims, 2 Drawing Sheets

PLASMA DISPLAY WITH BARRIER RIB OF SPECIFIC CONSTRUCTION

TECHNICAL FIELD

The present invention relates to a plasma display and a production process thereof. This plasma display can be used for a large-sized television set and computer monitor.

BACKGROUND ART

Since plasma display panels (PDPs) allow high speed display and make it easy to make large-sized display compared to liquid crystal panels, they are used in such areas as OA apparatuses and public relations display units. Furthermore, they are highly expected to be applicable in the area of high grade television sets.

With such expansion of application, color PDPs with many fine display cells attract attention. In a PDP, plasma discharge is caused between anodes and cathodes facing each other in discharge spaces formed between a front glass substrate and a rear glass substrate, and the ultraviolet ray generated by a gas contained in the discharge spaces is applied to the phosphors provided in the discharge spaces, for displaying. A simple structural view showing an AC type PDP is shown in FIG. 1. In this case, to keep the spread of discharge in certain regions for displaying in specified cells and to secure uniform discharge spaces, barrier ribs (also called barriers or ribs) are formed. In the case of AC type PDP, the barrier ribs are formed in stripes.

The barrier ribs are about 30 to 80 $\mu$m wide and 100 to 200 $\mu$m high. Usually the barrier ribs are formed by printing a paste containing a glass powder onto the front glass substrate or rear glass substrate in stripes by screen printing, drying, repeating the printing and drying 10 to 20 times to achieve a predetermined height, and firing. However, screen printing presents a problem in that especially when the panel size is larger, it is difficult to align the discharge electrodes preformed on the front transparent flat plate, with the printing positions of the glass paste, not allowing a high position accuracy to be achieved. In addition, since the glass paste is overlapped 10 to 20 times for printing, the barrier ribs become wavy and disordered at the bottoms and cannot be accurate enough in height, so that the display quality, working efficiency and yield are delivered. Especially in the case of barrier ribs with a width of 50 $\mu$m or less formed at a pitch of 100 $\mu$m or less, the paste is likely to bleed at the bottoms due to thixotropy, and it is difficult to form sharp barrier ribs free from residue.

Since PDPs larger in area and higher in resolution are being adopted, it becomes technically more and more difficult to produce highly accurate barrier ribs with a high aspect ratio by screen printing, and screen printing becomes less advantageous in view of cost.

As methods to solve these problems, U.S. Pat. Nos. 4,885,963 and 5,209,688 and Japanese Patent Laid-Open (Kokai) Nos. 5-342992 and 6-295676 propose methods for forming barrier ribs by photolithography using a photosensitive paste. However, is these methods present problems, for example, in that dense barrier ribs cannot be obtained after firing because the glass content of the photosensitive paste is small, and in that the photosensitive paste is low in sensitivity and resolution. For these reasons, it was necessary to repeat the photosensitive paste coating, exposure and development, for obtaining barrier ribs with a high aspect ratio. However, the repetition of coating, exposure and development causes the problem of positioning and restricts the cost reduction.

Japanese Patent Laid-Open (Kokai) No. 8-50811 proposes a method of forming barrier ribs by one single exposure time using a photosensitive glass paste. However, this method presents problems, for example, in that when a pattern with thin barrier ribs is formed, the pattern meanders, falls or peels after exposure and development and that when the pattern is fired to form barrier ribs, the barrier ribs are broken or peeled. Furthermore, depending on the sectional form of the barrier ribs, disadvantageously, the phosphors cannot be uniformly applied.

DISCLOSURE OF THE INVENTION

An object of the present invention is to provide a high-resolution plasma display with barrier ribs with less meandering, falling, peeling and breaking by improving the strength of the barrier ribs and their adhesion to the substrate. Another object of the present invention is to provide a high-resolution plasma display good in uniformity of phosphor coating and less in luminance irregularity. A still further object of the present invention is to provide a highly luminous and high-resolution plasma display excellent in light emission characteristics. The plasma display in the present invention refers to a display in which the discharging in the discharge spaces formed by barrier ribs causes displaying, and can be used as any of various displays such as plasma address liquid crystal display, in addition to the above mentioned AC type PDP.

The objects of the present invention can be achieved by a plasma display, with barrier ribs formed on a substrate, characterized by satisfying the following formulae:

$Lt/Lh$=0.65 to 1

$Lb/Lh$=1 to 2 where Lt is the width at the top of each barrier rib; Lh is the width at the center in height; Lb is the width at the bottom; and the case of Lt=Lh=Lb is excluded.

The objects of the present invention can also be achieved by a plasma display, with barrier ribs formed on a substrate, characterized by satisfying the following formulae:

$L90/Lh$=0.65 to 1

$L10/Lh$=1 to 2 where L90 is the width at 90% in height of each barrier rib; Lh is the width at the center in height; L10 is the width at 10% in height; and a case of L90=Lh=L10 is excluded.

BEST MODE FOR CARRYING OUT THE INVENTION

In the plasma display of the present invention, since the barrier ribs are tapered on the lateral sides, they are high in strength and can be prevented from falling.

The barrier ribs for the plasma display of the present invention satisfy the following formulae:

Lt/Lh=0.65 to 1

Figure 1:
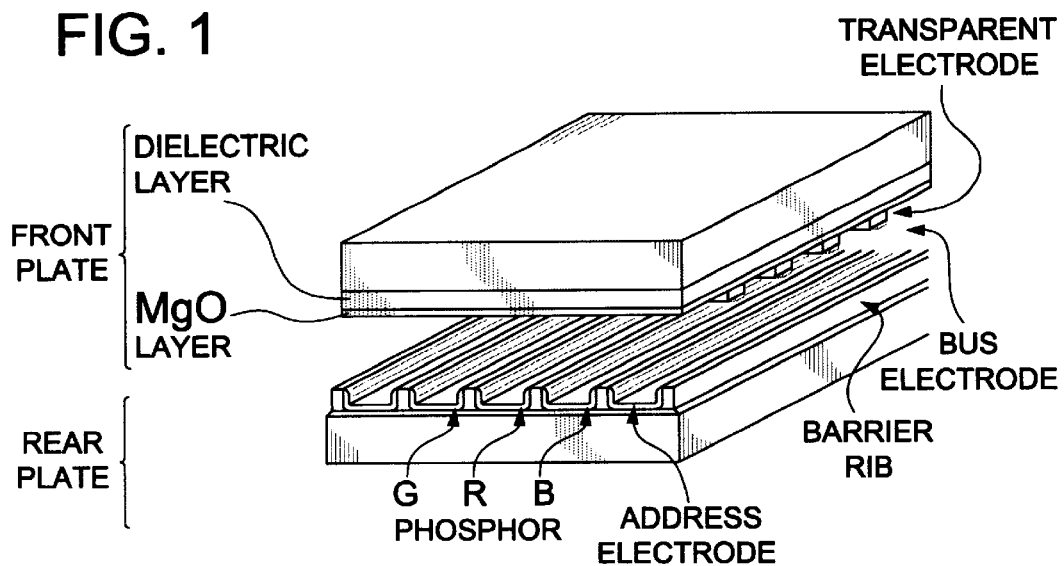
FIG. 1 is a simplified structural view showing a plasma display.
Figure 2:
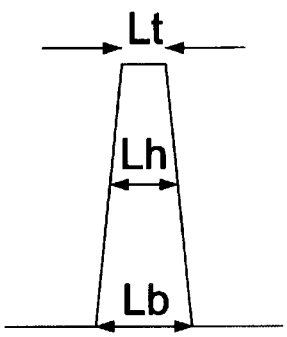
FIGS. 2 to 4 and 6 to 8 are simplified sectional views showing the forms of the barrier ribs of the present invention.

Lb/Lh=1 to 2 where Lb is the width at the bottom, Lh is the width at the center in height, and Lt is the width at the top. An example of this version of the present invention is shown in FIG. 2.

In the drawing, Lb is the width at the bottom of each barrier rib, Lh is the width at the center in height of the barrier rib (the width at a height of 50 from the bottom when the height of the barrier rib is 100), and Lt is the width at the top of the barrier rib.

If Lt/Lh is larger than 1, the barrier ribs have a narrow part at the center in height, and since the ratio of the discharge spaces to the pitch of the barrier ribs, i.e., the open width rate becomes small, thus lowering the luminance. Furthermore, when the phosphor layer is formed, irregularity in coating, i.e., irregularity in thickness and unevenness occur. If the ratio is less than 0.65, the top of each barrier rib becomes too thin and loses the strength to withstand the atmospheric pressure acting when the panel is formed, being likely to be crushed.

If Lb/Lh is less than 1, then undesirably, the strength is so low as to cause the barrier ribs to fall or meander. If the ratio is larger than 2, the discharge spaces are decreased to lower the luminance.

It is more preferable in view of securing the open width ratio that Lt/Lh is 0.8 to 1 and that Lb/Lh is 1 to 1.5.

However, the case of Lt=Lh=Lb is not preferable since the barrier ribs are low in strength and likely to fall.

As the form of each barrier rib, a trapezoidal or rectangular form free from a narrow part at the bottom of the barrier rib is preferable in view of strength.

When it is difficult to define the width at the top of a barrier rib or the width at the bottom because the top is round or the bottom is gradually expanded, the width at 90% in height (L90) is measured instead of the width at the top or the width at 10% in height (L10) is measured instead of the width at the bottom. The barrier ribs for the plasma display of the present invention in this case satisfy the following formulae:

L90/Lh=0.65 to 1

L10/Lh=1 to 2

Figure 3:
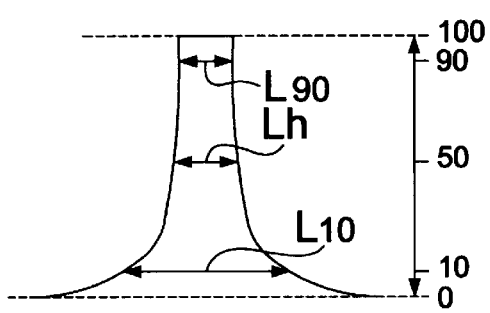

An example of this version of the present invention is shown in FIG. 3.

In the drawing, L90 is the width of the barrier rib at a height of 90 from the bottom when the height of the barrier rib is 100, and L10 is the width at a height of 10 from the bottom.

The case of L90=Hh=L10 is not preferable for the same reason as that for a case of Lt=Lh=Lb.

In the present invention, especially when high-resolution barrier ribs with a width of 50 μm or less formed at a pitch of 230 μm or less are formed in a large panel of 32 inches or more, the barrier ribs with the above form can be prevented from meandering, deflecting and breaking after firing.

If the barrier rib pattern before firing is formed as above, especially the contact areas with the substrate glass and the dielectric layer become large, thus improving the form integrity and stability. As a result, the peeling and breaking after firing can be prevented.

The method for measuring the width of a barrier rib is not especially limited, but it is preferable to measure using an optical microscope, scanning electron microscope or laser microscope.

For example when a scanning electron microscope (e.g., Hitachi S-2400) is used, the following method is preferable. Barrier ribs are cut to obtain an accurate cross section as shown in FIG. 2, and processed to a size to allow observation. In this case, if the section is oblique, accurate measurement cannot be effected. Hence the section should be at right angles to the direction of the stripes. The magnification for measurement should be selected to retain about 2 to 5 barrier ribs in the field of view. For example, if the pitch is 150 μm, a magnification of 200 to 300 times is used. Then, a standard sample with a size equivalent to the barrier rib width is used to calibrate the scale, and a photo is taken, to calculate the barrier rib width from the scale.

For nondestructive measurement, a laser focus displacement gauge (e.g., LT-8010 produced by K. K. Key Ence) can also be used. In this case, it is also preferable to calibrate using a standard sample before measurement. For accurate measurement, it is preferable to confirm that the measuring face of the laser is at right angles to the direction of the stripes.

Figure 4:
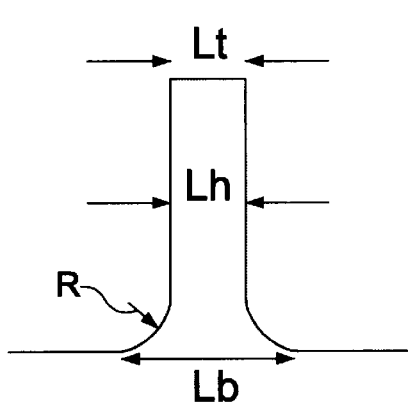

The inclining face is not limited to a flat face, but can have a curvature. Especially if the portion from an intermediate point in height of the barrier rib to the bottom is curved as shown in FIG. 4, the discharge spaces can be larger even if Lb/Lh is large as is preferred, and the luminance is not lowered. As the form of the curvature, it is especially preferable, in view of the higher effect, that the radius of curvature R in the curved portion of the barrier rib and the width at the center in height Lh satisfy the following relation:

R≦Lh/2

Furthermore, in the present invention, it is preferable that the relation between the width (L) and deflection (Ld) of the barrier rib is in the following range.

Ld/L=1 to 1.5

A more preferable range is Ld/L=1 to 1.2.

Ld/L=1 corresponds to an ideal form free from deflection of the barrier rib.

If Ld/L is larger than 1.5, the phosphor coating becomes irregular in thickness, and erroneous coating is likely to occur, thus undesirably lowering the yield. Furthermore, since the pitch of barrier ribs becomes irregular, remarkable luminance irregularity occurs.

The above range shows the deflection of the barrier ribs after firing. Since firing decreases the deflection by about 20%, it is preferable that the deflection of the barrier rib pattern before firing is in a range of Ld/L=1 to 1.7.

The width of the barrier rib in this case can be any of the width at the top, the width at the center in height and the width at the bottom in the cross section of the barrier rib, but for easy measurement, it is preferable to measure the width at the top of the barrier rib as shown in FIG. 2. When it is difficult to define the width at the top because the top of the barrier rib is round, it is preferable to use the width L90 at 90% in height as described before.

Figure 5:
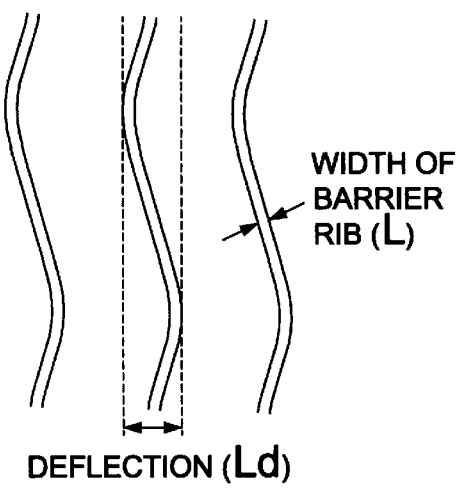
FIG. 5 is a schematic drawing showing the form of barrier ribs from above.

The method for measuring the deflection is not limited either, but it is preferable to measure the deflection under the same conditions as in measuring the width. Hence, it is preferable to measure the deflection of the width at the top. As a specific measuring method, as shown in FIG. 5, the zigzag width of the barrier rib is measured.

It is preferable that the extent over which the deflection is measured is a length of at least 10 times or more of the barrier rib pitch along each barrier rib, and the largest deflection in this region is defined as the deflection.

It is preferable, in view of the high open width ratio and high luminance, that the width of the barrier ribs in the present invention is 15 to 50 μm. If the width is larger than 50 μm, the open width ratio is so small that a sufficient luminance cannot be obtained, and if smaller than 15 μm, the strength is insufficient and, undesirably, the barrier ribs may be destroyed at the time of sealing.

It is preferable that the pitch of the barrier ribs is 100 to 250 μm. A more preferable range is 100 to 160 μm. If the pitch is in this range, a high-resolution plasma display can be obtained.

It is preferable in view of discharge stability and luminance that the height of the barrier ribs is 60 to 170 μm. A more preferable range is 100 to 170 μm. If the height is not in this range, erroneous discharge occurs and, undesirably, the luminance becomes low.

If the pitch of the barrier ribs of the present invention is P, the width is L and the height is H, then the following relations are more preferable since the panel is excellent in luminance and discharge life.

If P=100 to 140 μm, then
L=15 to 40 μm and H=100 to 140 μm
If P=140 to 160 μm, then
L=20 to 50 μm and H=120 to 170 μm If the width is smaller than the above lower limit, peeling and falling at the time of pattern formation and breaking and peeling after firing are liable to occur. If larger than the above upper limit, the open width ratio becomes so small as to lower undesirably the luminance.

If the height is smaller than the above lower limit, the discharge spaces become narrow, the plasma area becomes closer to the phosphor layer, and because the phosphor layer is sputtered, it is undesirable having regard to its life. If larger than the above upper limit, the ultraviolet ray generated by discharge is absorbed before it reaches the phosphor layer, so as to lower undesirably the luminance.

It is preferable that the porosity of the barrier ribs in the present invention is 10% or less for prevention of falling of the barrier ribs and the excellent adhesion to the substrate. More preferable is 3% or less. The porosity (P) is defined as follows:

$$P=(dth-dex)/dth \times 100$$

where dth is the true specific gravity of the barrier rib material and dex is the measured density of the barrier ribs.

It is preferable to calculate the true specific gravity of the barrier rib material using the following so-called Archimedes method. The barrier rib material is ground by a mortar to such an extent that it cannot be felt by finger tip, i.e., 325-mesh or smaller size, and the true specific gravity is measured as stated in JIS R 2205.

The measured density is measured according to the Archimedes method as described above, except that a barrier rib portion is taken by cutting without deforming it, and is not ground.

If the porosity is larger than 10%, the adhesive strength decreases, and the strength also decreases. Furthermore, the gas and water discharged from the pores at the time of discharge are adsorbed, thus lowering the light emission characteristics such as luminance. Considering the light emission characteristics such as the discharge life and luminance stability of the panel, more preferable is 1% or less.

Figure 8:
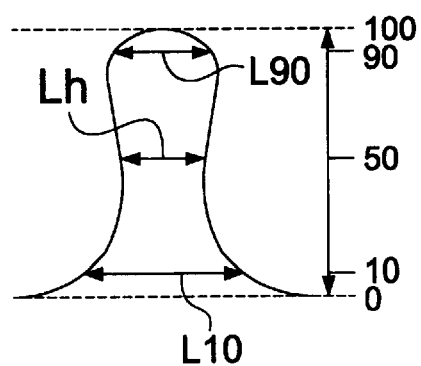

The method for forming the barrier ribs of the present invention is not especially limited, but it is preferable to use a photosensitive paste because the method has only a few steps and allows a fine pattern to be formed. If sand blasting is used, since the barrier rib pattern is formed by sand blast grinding, control is difficult, and the bottoms may be expanded excessively due to insufficient grinding and the tops maybecome too thin due to excessive grinding. If screen printing is used, since printing is repeated by 10 to 20 times, the bottoms of the barrier ribs may be crushed and the bottoms of the barrier ribs may droop, as shown in FIG. 8.

In the photosensitive paste method, a photosensitive paste consisting of an inorganic component mainly composed of a glass powder and a photosensitive organic component is printed in the pattern of a photo mask by exposure, developed to form a barrier rib pattern, and fired, to obtain the barrier ribs.

In the case of barrier ribs used for a plasma display or plasma address liquid crystal display, since the pattern is formed on a glass substrate low in glass transition point and softening point, it is preferable to use a glass material with a glass transition point of 430 to 500° C. and a softening point of 470 to 580° C. as the material of the barrier ribs. If the glass transition point is higher than 500° C. or if the softening point is higher than 580° C., firing at high temperature is required, and the substrate is strained at the time of firing. In the case of a material with a glass transition point of lower than 430° C. or a softening point of lower than 470° C., a dense barrier rib layer cannot be obtained, and peeling, breaking and meandering of the barrier ribs are caused.

It is preferable to measure the glass transition point and softening point as described below. Using differential thermal analysis (DTA), about 100 mg of a glass sample is heated in air at 20° C./min, and the temperature is chosen as the abscissa while the number of calories is chosen as the ordinate, to draw a DTA curve. From the DTA curve, the glass transition point and the softening point are read.

Since the coefficient of thermal expansion of a general high strain glass used as the substrate glass is 80 to $90 \times 10^{-7}$, it is preferable to use a glass material with a coefficient of thermal expansion at 50 to 400° C. ($\alpha^{50-400}$) of 50 to $90 \times 10^{-7}$, especially 60 to $90 \times 10^{-7}$ to prevent the warping of the substrate and the cracking at the time of panel sealing. If a glass material with this property is used, the peeling and breaking of the barrier ribs can be prevented.

It is preferable that the amount of the glass powder used for the photosensitive paste method is 65 to 85 wt % based on the sum of the glass powder and the organic component.

If the amount is smaller than 65 wt %, the shrinkage at the time of firing becomes large, so as undesirably to cause the breaking and peeling of the barrier ribs. Furthermore, the paste is hard to dry and sticky and declines in printability. Moreover, the pattern is likely to be thicker and at the time of development, the film is likely to remain. For this reason, Lb/Lh is likely to be larger than 2. If the amount is larger than 85 wt %, the photosensitive component decreases, not allowing the barrier rib pattern to be photo-polymerized at the bottoms. Hence, Lb/Lh is likely to be smaller than 1.

As for the composition of the barrier rib material, it is preferable that silicon oxide is present in an amount of 3 to 60 wt % in the glass. If the amount is smaller than 3 wt %, the denseness, strength and stability of the glass layer decrease, and the coefficient of thermal expansion deviates from the desired value, causing mismatching with the glass substrate. If the amount is larger than 60 wt %, the softening point decreases, and advantageously, the firing onto the glass substrate becomes possible.

If boron oxide is present in the glass in an amount of 5 to 50 wt %, the electric, mechanical and thermal properties such as electric insulation, strength, coefficient of thermal expansion and denseness of insulation layer can be improved. If more than 50 wt %, the stability of the glass decreases.

If a glass powder containing 5 to 50 wt % of at least one of bismuth oxide, lead oxide and zinc oxide is used, a photosensitive paste with a temperature characteristic such as to allow pattern forming on the glass substrate can be obtained. If the amount exceeds 50 wt %, the heat resistant temperature of glass is so low as to make it difficult to fire on the glass substrate. Especially using a glass containing 5 to 50 wt % of bismuth oxide has an advantage that the pot life of the paste is long.

It is preferable that the glass containing bismuth oxide contains 50 wt % or more of the following composition, if expressed as oxides, 10 to 40 parts by weight of bismuth oxide 3 to 50 parts by weight of silicon oxide 10 to 40 parts by weight of boron oxide 8 to 20 parts by weight of barium oxide 10 to 30 parts by weight of aluminum oxide.

Even if a glass powder containing 2 to 20 wt % of at least one of lithium oxide, sodium oxide and potassium oxide is used, a photosensitive paste with a temperature characteristic such as to allow pattern forming on the glass substrate can be obtained. If the amount of the oxide of an alkali metal such as lithium, sodium or potassium is 20 wt % or less, especially 15 wt % or less, the stability of the paste can be improved.

It is preferable that the glass containing lithium oxide contains 70 wt % or more of the following composition, if expressed as oxides, 2 to 15 parts by weight of lithium oxide 15 to 50 parts by weight of silicon oxide 15 to 40 parts by weight of boron oxide 2 to 15 parts by weight of barium oxide 6 to 25 parts by weight of aluminum oxide Furthermore, in the above composition, sodium oxide or potassium oxide can also be used instead of lithium oxide, but having regard to the stability of the paste, lithium oxide is preferable.

If the glass contains both a metal oxide such as lead oxide, bismuth oxide or zinc oxide and an alkali metal oxide such as lithium oxide, sodium oxide or potassium oxide, the softening point and the coefficient of thermal expansion can be easily controlled at a lower alkali content.

If the glass powder contains aluminum oxide, barium oxide, calcium oxide, magnesium oxide, zinc oxide, zirconium oxide, etc., especially aluminum oxide, barium oxide and zinc oxide, the hardness and processability can be improved, but for control of softening point, coefficient of thermal expansion and refractive index, it is preferable that their content is 40 wt % or less. More preferable is 25 wt % or less.

The glass generally used as an insulator has a refractive index of about 1.5 to 1.9. When the photosensitive paste method is used, if the average refractive index of the organic component is greatly different from that of the glass powder, the reflection and scattering at the interfaces between the glass powder and the organic component become large, and an accurate pattern cannot be obtained. Since the refractive index of a general organic component is 1.45 to 1.7, it is preferable that the average refractive index of the glass powder is 1.5 to 1.7, to match the glass powder with the organic component in refractive index. A more preferable range is 1.5 to 1.65.

When a glass containing 2 to 20 wt % in total of oxides of alkali metals such as sodium oxide, lithium oxide and potassium oxide, it is easy to control the softening point and the coefficient of thermal expansion, and in addition, since the average refractive index of the glass can be lowered, the difference from the refractive index of the organic substance can be easily kept small. If the amount is smaller than 2%, the control of softening point becomes difficult. If larger than 20%, the alkali metal oxides are evaporated at the time of discharge, thus lowering the luminance. To improve the stability of the paste, it is preferable that the amount of alkali metal oxides is smaller than 10 wt %, and more preferable is 8 wt % or less.

Among the alkali metal oxides, the use of lithium oxide is especially preferable, because the stability of the paste can be relatively enhanced. The use of potassium oxide has an advantage that the refractive index can be controlled even by a relatively small amount.

As a result, the paste has a softening point such as to allow firing onto the glass substrate and can have an average refractive index of 1.5 to 1.7, so as easily to lessen the difference from the organic component in refractive index.

A glass containing bismuth oxide is preferable having regard to the softening point and water resistance improvement, and a glass containing 10 wt % or more of bismuth oxide mostly has a refractive index of 1.6 or more. Hence, if an alkali metal oxide such as sodium oxide, lithium oxide or potassium oxide and bismuth oxide are used together, the softening point, coefficient of expansion, water resistance and refractive index can be easily controlled.

If the refractive index of the glass material in the present invention is measured at the same wavelength as that of the light used for exposure in the photosensitive glass paste method, the effect can be accurately confirmed. It is especially preferable to measure using light with a wavelength range of 350 to 650 nm. Furthermore, it is preferable to measure the refractive index at the i-line (365 nm) or g-line (436 nm).

The barrier ribs of the present invention can be colored black for better contrast. If the photosensitive paste contains any of various metal oxides, the barrier ribs can be colored after firing. For example, if the photosensitive paste contains 1 to 10 wt % of a black colored metal oxide, a black pattern can be formed.

If the black colored metal oxide used in this case is at lease one, preferably three or more of the oxides of Cr, Fe, Co, Mn and Cu, the barrier ribs can be blackened. Especially when the paste contains 0.5 wt % or more of each of oxides of Fe and Mn, black barrier ribs can be formed.

If pastes respectively containing any of the inorganic pigments coloring in red, blue or green, etc. other than black, a pattern of the color concerned can be formed. The colored pattern can be suitably used for a color filter of a plasma display, etc.

It is preferable that the dielectric constant of the glass material of the barrier ribs is 4 to 10 at a frequency of 1 MHz and at 20° C. because then the panel is excellent in power consumption and discharge life. To maintain the dielectric constant at less than 4, the glass material must contain much silicon oxide with a dielectric constant of about 3.8, so as to be high in glass transition point, requiring a high firing temperature. Hence, the substrate may be undesirably strained. If the dielectric constant is more than 10, the electrified quantity increases so that the power is host, increasing undesirably the power consumption.

It is preferable that the specific gravity of the barrier ribs of the present invention is 2 to 3.3. To maintain the specific gravity at less than 2, the glass material must contain large amounts of alkali metal oxides such as sodium oxide and potassium oxide, and during discharge, they are evaporated, thus lowering undesirably the light emssion characteristics. If the specific gravity is more than 3.3, the display with a larger screen becomes heavy, and its weight undesirably strains the substrate.

The grain size of the glass powder used is selected, in dependence upon the width and height of the barrier ribs to be formed, but it is preferable that 50 vol % of the glass powder has a grain size of 1 to 6 μm (average grain size D50), a largest grain size of 30 μm or less and a specific surface area of 1.5 to 4 m$^2$/g. It is more preferable that 10 vol % of the glass powder has a grain size of 0.4 to 2 μm (D10), 50 vol % has a grain size of 1.5 to 6 μm in the (D50), 90 vol % has a grain size of 4 to 15 μm (D90), a largest grain size of 25 μm or less and a specific surface area of 1.5 to 3.5 m$^2$/g. It is further more preferable that the glass powder has a D5 of 2 to 3.5 μm and a specific surface area of 1.5 to 3 m$^2$/g.

In the above, D10, D50 and D90 respectively express the grain sizes of 10 vol %, 50 vol % and 90 vol % of smaller grains in the glass powder.

If a glass powder with a grain size distribution as described above is used, the packing density of the powder can be improved, and even if the powder ratio in the photosensitive paste is increased, voids are trapped less, thus keeping the extra light scattering small allowing a preferable barrier rib pattern to be formed. If the grain size of the glass powder is smaller than the above ranges, the specific surface area increases, making the powder more cohesive, thus lowering the dispersibility into the organic component. Hence, voids are likely to be trapped, thus increasing the light scattering, and the barrier ribs become thicker at the centers and insufficiently cured at the bottoms. As a result, Lb/Lh is likely to be smaller than 1. Furthermore, even if the grain size of the glass powder is larger than the above ranges, the bulk density of the powder decreases, thus lowering the packing density, and since the amount of the photosensitive organic component is insufficient, voids are likely to be trapped, thus causing light scattering. If the grain size distribution of the glass powder is in said ranges, the powder packing ratio is so high as to keep the shrinkage at firing low, and the pattern is not deformed at the time of firing, allowing the barrier rib form of the present invention to be secured stably.

The method for measuring the grain size is not especially limited, but it is preferable to use the laser diffraction scattering method for simple measurement. For example, a grain size distribution tester HRA9320-X100 produced by Microtrac can be used under the following measuring conditions:

Amount of sample: 1 g

Dispersion conditions: Ultrasonic dispersion in purified water for 1 to 1.5 minutes. If dispersion is difficult, it is effected in 0.2% aqueous solution of sodium hexametaphosphate.

Refractive index of grains: To be changed depending on the glass used (1.6 in the case of lithium based glass and 1.88 in the case of bismuth based glass)

Refractive index of solvent: 1.33

Number of measuring times: 2

The barrier ribs of the present invention can contain 3 to 60 wt % of a filler with a softening point of 550 to 1200° C., especially 650 to 800° C. In the photosensitive paste method, this keeps the shrinkage at the time of firing after pattern formation small, thus allowing easier pattern formation and to improve the form integrity after firing.

A preferable filler is a high melting point glass powder containing 15 wt % or more of a ceramic compound such as titania, alumina, barium titanate or zirconia, or silicon oxide or aluminum oxide. For example, it is preferable to use a glass powder composed as follows:

Silicon oxide: 25 to 50 wt %

Boron oxide: 5 to 20 wt %

Aluminum oxide: 25 to 50 wt %

Barium oxide: 2 to 10 wt %

If a high melting point powder greatly different from the parent glass material low melting point glass) in refractive index is used as a filler, it is difficult to match it with the organic component, and the pattern formability is lowered.

Hence, if the average refractive index N1 of the low melting point glass powder and the average refractive index N2 of the high melting point glass powder satisfy the following relation, matching with the organic component in refractive index becomes easy.

$$-0.05 \leq N1-N2 \leq 0.05$$

It is also important for decreasing the light scattering, that the inorganic powder is less dispersed in refractive index. It is preferable, for decreasing the light scattering, that the dispersion of refractive index is ±0.05 (that 95 vol % or more of the inorganic powder satisfies a range of average refractive N1±0.05).

It is preferable that the average grain size of the filler used is 1 to 6 μm. It is preferable for pattern formation, to use a filler with a grain size distribution of 0.4 to 2 μm in D10 (grain size of 10 vol %), 1 to 3 μm in D50 (grain size of 50 vol %), 3 to 8 μm in D90 (grain size of 90 vol %) and 10 μm or less in the largest grain size.

It is more preferable that D90 is 3 to 5 μm and that the largest grain size is 5 μm or less. It is preferable that the filler is a fine powder of 3 to 5 μm in D90 because the firing shrinkage can be kept low and because the filler is excellent in producing barrier ribs with a low porosity. Furthermore, the roughness in the longitudinal direction at the tops of the barrier ribs can be kept at ±2 μm or less. If a powder with a large grain size is used as the filler, the porosity rises, and the roughness at the tops of the barrier ribs becomes large, so as undesirably to induce erroneous discharges.

The organic component contains at least one photosensitive component selected from photosensitive monomers, photosensitive oligomers and photosensitive polymers, and as required, further contains such additives as a binder, photo polymerization initiator, ultraviolet ray absorber, sensitizer, sensitizing auxiliary, polymerization inhibitor, plasticizer, thickener, organic solvent, antioxidant, dispersing agent, organic or inorganic precipitation preventive and leveling agent.

The photosensitive component can be either of the photo desolubilizing type and photo solubilizing type. Photo desolubilizing ingredients include:

(A) Functional monomers, oligomers and polymers with one or more unsaturated groups, etc. in the molecule (B) Those containing a photosensitive compound such as an aromatic diazo compound, aromatic azide compound or organic halogen compound, etc.

(C) So-called diazo resins such as condensation products of a diazo based amine and formaldehyde.

The photo solubilizing ingredients include:

(D) Those containing an inorganic salt of a diazo compound, a complex with an organic acid or a quinonediazo (E) Those with a quinonediazo combined with a suitable polymer binder, such as naphthoquinone-1,2-diazido-5-sulfonic acid ester of phenol or novolak resin.

As the photosensitive component used in the present invention, any of the above can be used. However, a preferable photosensitive component which can be simply used as a mixture with an inorganic powder for the photosensitive paste is of any one of (A).

The photosensitive monomers are compounds with a carbon—carbon unsaturated bond, for example, methyl acrylate, ethyl acrylate, n-propyl acrylate, isopropyl acrylate, n-butyl acrylate, sec-butyl acrylate, iso-butyl acrylate, tert-butyl acrylate, n-pentyl acrylate, allyl acrylate, benzyl acrylate, butoxyethyl acrylate, butoxytriethylene glycol acrylate, cyclohexyl acrylate, dicyclopentanyl acrylate, dicyclopentenyl acrylate, 2-ethylhexyl acrylate, glycerol acrylate, glycidyl acrylate, heptadecafluorodecyl acrylate, 2-hydroxyethyl acrylate, isobornyl acrylate, 2-hydroxypropyl acrylate, isodecyl acrylate, isooctyl acrylate, lauryl acrylate, 2-methoxyethyl acrylate, methoxyethylene glycol acrylate, methoxydiethylene glycol acrylate, octafluoropentyl acrylate, phenoxyethyl acrylate, stearyl acrylate, trifluoroethyl acrylate, allylated cyclohexyl diacrylate, 1,4-butanediol diacrylate, 1,3-butylene glycol diacrylate, ethylene glycol diacrylate, diethylene glycol diacrylate, triethylene glycol diacrylate, polyethylene glycol diacrylate, dipentaerythritol hexaacrylate, dipentaerythritol monohydroxypentaacrylate, ditrimethylolpropane tetraacrylate, glycerol diacrylate, methoxylated cyclohexyl diacrylate, neopentylglycol diacrylate, propylene glycol diacrylate, polypropylene glycol diacrylate, triglycerol diacrylate, trimethylolpropane triacrylate, acrylamide, aminoethyl acrylate, phenyl acrylate, phenoxyethyl acrylate, benzyl acrylate, 1-naphthyl acrylate, 2-naphthyl acrylate, bisphenol A diacrylate, diacrylate of bisphenol A—ethylene oxide addition product, diacrylate of bisphenol A—propylene oxide addition product, thiophenol acrylate, benzylmercaptan acrylate, monomers in which one to five hydrocarbon atoms of the aromatic ring of any of these compounds are substituted by chlorine or bromine atoms, styrene, p-methylstyrene, o-methylstyrene, m-methylstyrene, chlorinated styrene, brominated styrene, α-methylstyrene, chlorinated α-methylstyrene, brominated, α-methylstyrene, chloromethylstyrene, hydroxymethylstyrene, carboxymethylstyrene, vinylnaphthalene, vinylanthracene, vinylcarbazole, those in which the acrylates in the molecule of any of the above compounds are partially or wholly substituted by methacrylates, γ-methacryloxypropyltrimethoxysilane, 1-vinyl-2-pyrrolidone, etc. In the present invention, one or more of them can be used.

In addition to the above, an unsaturated acid such as an unsaturated carboxylic acid can be added to improve the developability after exposure. The unsaturated caxboxylic acids which can be used here include, for example, acrylic acid, methacrylic acid, itaconic acid, crotonic acid, maleic acid, fumaric acid, vinylacetic acid and their acid anhydrides, etc.

It is preferable that the content of any of these monomers is 5 to 30 wt % based on the sum of the glass powder and the photosensitive component. If the content is not in this range, the pattern formability is lowered and undesirably the hardness after hardening becomes insufficient.

The binders which can be used here include polyvinyl alcohol, polyvinyl butyral, methacrylate polymers, acrylate polymers, acrylate-methacrylate copolymers, α-methylstyrene polymer, butyl methacrylate resin, etc.

Furthermore, the oligomers and polymers obtained by polymerzing at least one of the above mentioned compounds with a carbon—carbon double bond can be used. For polymerization, another photosensitive monomer can be copolymerized in such a manner that the content of any of these photoreactive monomers is 10 wt % or more, especially 35 wt % or more.

As the monomer to be copolymerized, an unsaturated acid such as an unsaturated carboxylic acid can be copolymerized to enhance the developability after exposure. The unsaturated carboxylic acids which can be used here include, for example, acrylic acid, methacrylic acid, itaconic acid, crotonic acid, maleic acid, fumaric acid, vinylacetic acid, and their acid anhydrides.

It is preferable that the acid value (AV) of the polymer or oligomer with acidic groups such as carboxyl groups at the side chains thus obtained is 50 to 180. A more preferable range is 70 to 140. If the acid value is less than 50, the solubility of the non-exposed portions in the developer decreases, and if the concentration of the developer is raised, the exposed portions, too, are peeled, making it difficult to obtain a high-resolution pattern. If the acid value is more than 180, the development allowance becomes narrow.

When a monomer such as an unsaturated acid is used for enhancing the developability, it is preferable to keep the acid value of the polymer at 50 or less, since the gelation caused by the reaction between the glass powder and the polymer can be controlled.

If photoreactive groups are added to the side chains or molecular ends of any of the polymers and oligomers enumerated above, the polymer or oligomer can be used as a photosensitive polymer or photosensitive oligomer. Preferable photoreactive groups are ethylenic unsaturated groups which include vinyl groups, allyl groups, acrylic groups, methacrylic groups, etc.

Such side chains can be added to the oligomer or polymer, for example, by letting an ethylenic unsaturated compound with an glycidyl group or isocyanato group, acrylic acid chloride, methacrylic acid chloride or allyl chloride addition-react with the mercapto groups, amino groups, hydroxyl groups or carboxyl groups in the polymer.

The ethylenic unsaturated compound with a glycidyl group can be selected from glycidyl acrylate, glycidyl methacylate, allyl glycidyl ether, glycidyl ethylacrylate, crotonyl glycidyl ether, glycidyl crotonate ether, glycidyl isocrotonate ether, etc.

The ethylenic unsaturated compound with an isocyanato group can be selected from (meth)acryloyl isocyanate, (meth)acryloylethyl isocyanate, etc.

It is preferable that the ethylenic unsaturated compound with a glycidyl group or isocyanato group, acrylic acid chloride, methacrylic acid chloride or allyl chloride is added in an amount of 0.05 to 1 mole equivalent for each equivalent of the mercapto groups, amino groups, hydroxyl groups or carboxyl groups in the polymer.

It is preferable that the amount of the polymer component consisting of the photosensitive polymer or photosensitive oligomer and the binder in the photosensitive paste is 5 to 30 wt % based on the sum of the glass powder and the photosensitive component because the pattern formability and firing shrinkage are excellent. If the amount is not in this range, the pattern cannot be formed or the pattern becomes thick unpreferably.

The photo polymerization initiators which can be used here include, for example, benzophenone, methyl o-benzoylbenzoate, 4,4-bis(dimethylamino)benzophenone, 4,4-bis(diethylamino)benzophenone, 4,4-dichlorobenzophenone, 4-benzoyl-4-methyldiphenyl ketone, dibenzyl ketone, fluorenone, 2,2-diethoxyacetophenone, 2,2-dimethoxy-2-phenyl-2- phenylacetophenone, 2-hydroxy-2-methylpropiophenone, p-t-butyldichloroacetophenone, thioxanthone, 2-methylthioxanthone, 2-chlorothioxanthone, 2-isopropylthioxanthone, diethylthioxanthone, benzil, benzyl dimethyl ketal, benzyl methoxyethyl acetal, benzoin, benzoin methyl ether, benzoin butyl ether, anthraquinone, 2-t-butylanthraquinone, 2-amylanthraquinone, β-chloroanthraquinone, anthrone, benzanthrone, dibenzosuberone, methyleneanthrone, 4-azidobenzalacetophenone, 2,6-bis(p-azidobenzlidene) cylohexanone, 2,6-bis(p-azidobenzylidene)4-methylcyclohexanone, 2-phenyl-1,2-butadione-2-(o-methoxycarbonyl)oxime, 1-phenyl-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, Michler's ketone, 2-methyl-[4-(methylthio)phenyl]-2-morphohlno-1-propanone, naphthalenesulfonyl chloride, quinolinesulfonyl chloride, N-phenylthioacridone, 4,4-azobisisobutyronitrile, diphenyl disulfide, benzthiazole disulfide, triphenylphosphine, camphorquinone, carbon tetrabromide, tribromophenylsulfone, benzoin peroxide, and combinations of a photoreducing dye such as Eosine or Methylene Blue and a reducing agent such as ascorbic acid or triethanolamine. In the present invention, one or more of them can be used.

The photo polymerization initiator is added in an amount of 0.05 to 20 wt % based on the weight of the photosensitive component. A more preferable range is 0.1 to 15 wt %. If the amount of the photo polymerization initiator is too small, photosensitivity becomes poor, and if the amount of the photo polymerization initiator is too large, the remaining ratio of exposed portions may be too small.

It is also effective to add an ultraviolet ray absorber. If a compound high in the effect of absorbing ultraviolet ray is added, a high aspect ratio, high accuracy and high resolution can be obtained. It is preferable that the ultraviolet ray absorber used is an organic dye, especially an organic dye with a high ultraviolet ray absorption coefficient in a wavelength range of 350 to 450 nm. The organic dyes which can be used here include azo dyes, aminoketone dyes, xanthene dyes, quinoline dyes, anthraquinone dyes, benzophenone dyes, diphenylcymoacrylate dyes, triazine dyes and p-aminobenzoic acid dyes. Even if an organic dye is added as a light absorber, it is preferable because the dye does not remain in the insulation film after firing, to decrease the degradation of insulation film properties by the remaing light absorber. Among the organic dyes, azo dyes and benzophenone dyes are preferable.

It is preferable that the amount of the organic dye added is 0.05 to 1 wt % based on the weight of the glass powder. If less than 0.05 wt %, the effect of adding the ultraviolet ray absorber is low. If more than 1 wt %, the photosensitivity becomes poor and then undesirably the insulation film properties after firing decline. A more preferable range is 0.05 to 0.15 wt %.

The ultraviolet ray absorber which is an organic dye can be added, for example, as described below. A solution with an organic dye dissolved in an organic solvent is prepared beforehand, and is kneaded when the paste is produced. As another method, a glass powder is mixed with the organic dye solution, and the mixture is dried. According to these methods, a powder in which the individual grains of the glass powder are coated on the surfaces with an organic dye film, so-called capsules, can be produced.

In the present invention, metal such as Pb, Fe, Cd, Mn, Co or Mg, etc., or any of their oxides present in the inorganic powder may react with the photosensitive component present in the paste, so as to gel the paste in a short time, not allowing coating. To prevent the reaction, it is preferable to add a stabilizer for preventing the gelation. It is preferable to use a triazole compound as the stabilizer. As the triazole compound, a benzotriazole derivative can be preferably used. As the benzotriazole derivative, especially benzotriazole acts effectively. An example of the surface treatment of the glass powder by the benzotriazole used in the present invention is described below. Benzotriazole is dissolved into an organic solvent such as methyl acetate, ethyl acetate, ethyl alcohol or methyl alcohol in a predetermined amount based on the amount of the inorganic powder, and the inorganic powder is immersed in the solution for 1 to 24 hours. After completion of immersion, the inorganic powder is naturally dried preferably at 20 to 30° C., to evaporate the solvent, for obtaining the triazole treated powder. It is preferable that the ratio of the stabilizer used (stabilizer/inorganic powder) is 0.05 to 5 wt %.

The sensitizer is added to improve sensitivity. The sensitizers which can be used here include 2,4-diethylthioxanthone, isopropylthioanthone, 2,3-bis(4-diethylaminobenzal)cyclopentanone, 2,6-bis(4-dimethylaminobenzal)cyclohexanone, 2,6-bis(4-dimethylaminobenzal)-4-methylcyclohexanone, Michler's ketone, 4,4-bis(diethylamino)-benzophenone, 4,4-bis (dimethylamino)chalcone, 4,4-bis(diethylamino)chalcone, p-dimethylaminocinnamylideneindanone, p-dimethylaminobenzylideneindanone, 2-(p-dimethylaminophenylvinylene)-isonapthothiazole, 1,3-bis (4-dimethylaminobenzal)acetone, 1,3-carbonyl-bis(4-diethylaminobenzal)acetone, 3,3-carbonyl-bis(7-diethylaminocoumarin), N-phenyl-N-ethylethanolamine, N-phenylethanolamine, N-tolyldiethanolamine, N-phenylethanolamine, isoamyl dimethylaminobenzoate, isoamyl diethylaminobenzoate, 3-phenyl-5-benzoylthio-tetrazole, 1-phenyl-5-ethoxycarbonylthio-tetrazole, etc. In the present invention, one or more of them can be used. Some of the sensitizers can also be used as photo polymerization initiators. When a sensitizer is added to the photosensitive paste of the present invention, the amount is usually 0.05 to 10 wt % based on the weight of the photosensitive component. A more preferable range is 0.1 to 10 wt %. If the amount of the sensitizer is too small, the effect of improving photosensitivity cannot be manifested, and if too large, the remaining rate of exposed portions may be too small.

Furthermore, as the sensitizer, a sensitizer which can absorb light with a wavelength equivalent to that of the light used for exposure can be used. In this case, near the absorbed wavelength, the refractive index becomes extremely high. Hence, if the sensitizer is added by a large amount, the refractive index of the organic component can be improved. The amount of the sensitizer which can be added in this case is 3 to 10 wt %.

The polymerization inhibitor is added to improve the thermostability during storage. The polymerization inhibitors which can be used here include hydroquinone, monoesterified products of hydroquinone, N-nitrosodiphenylamine, phenothiazine, p-t-butylcatechol, N-phenylnaphthylamine, 2,6-di-t-butyl-p-methylphenol, chloranil, pyrogallol, etc. When a polymerization inhibitor is added, the amount is usually 0.001 to 1 wt % in the photosensitive paste.

The plasticizers which can be used here include dibutyl phthalate, dioctyl phthalate, polyethylene glycol, glycerol, etc.

The antioxidant is added to prevent the oxidation of the acrylic copolymer during storage. The antioxidants which can be used here include 2,6-di-t-butyl-p-cresol, butylated hydroxyanisole, 2,6-di-t-4-ethylphenol, 2,2-methylene-bis(4-methyl-6-t-butylphenol), 2,2-methylene-bis(4-ethyl-6-t-butylphenol), 4,4-bis-(3-methyl-6-t-butylphenol), 1,1,3-tris-(2-methyl-6-t-butylphenol), 1,1,3-tris-(2-methyl-4-hydroxy-t-butylphenyl)butane, bis[3,3-bis-(4-hydroxy-3-t-butylphenyl)butyric acid]glycol ester, dilaurylthio dipropionate, triphenyl phosphite, etc. When an antioxidant is added, the amount is usually 0.001 to 1 wt % in the paste.

The photosensitive paste of the present invention may contain an organic solvent when it is desired to adjust the viscosity of the solution. The organic solvents which can be used here include methyl cellosolve, ethyl cellosolve, butyl cellosolve, methyl ethyl ketone, dioxane, acetone, cyclohexanone, cyclopentanone, isobutyl alcohol, isopropyl alcohol, tetrahydrokan, dimethyl sulfoxide, γ-butyrolactone, bromobenzene, chlorobenzene, dibromobenzene, dichlorobenzene, bromobenzoic acid, chlorobenzoic acid and organic solvent mixtures containing any one or more of them.

The refractive index of the organic component refers to the refractive index of the organic component in the paste at the moment when the photosensitive component is sensitized by exposure. That is, if the exposure is effected after drying the applied paste, the refractive index refers to the refractive index of the organic component in the paste after drying. For example, after the paste applied onto a glass substrate is dried at 50 to 100° C. for 1 to 30 minutes, the refractive index is measured.

For measuring the refractive index in the present invention, it is preferable to use the ellipsometric method or V block method generally used, and it is accurate for confirmation of the effect that the light with a wavelength equivalent to that of the light used for exposure is used for the measurement. It is especially preferable to measure using the light with a wavelength in a range of 350 to 650 nm. It is more preferable to measure the refractive index at the i-line (365 nm) or g-line (436 nm).

The refractive index after the organic component has been polymerized by irradiation with light can be measured by irradiating the organic component only with the light similar to the light used for photo irradiating the paste.

The photosensitive paste is usually produced by mixing the respective ingredients such as the inorganic powder, ultraviolet ray absorber, photosensitive polymer, photosensitive monomer, photo polymerization initiator and solvent at a predetermined ratio, and dispersing the mite homogeneously by a three-roller mill or kneading machine.

The viscosity of the paste can be suitably adjusted by the ratio of the inorganic powder, thickener, plasticizer, precipitation preventive agent, etc. added, and is in a range of 2,000 to 200,000 cps (centipoises). For example, when a glass substrate is coated by spin coating, the preferable viscosity is 200 to 5,000 cps. To obtain a 10 to 20 μm thick film by a single screen printing operation, it is preferable that the viscosity is 50,000 to 200,000 cps.

An example of forming a pattern using a photosensitive paste is described below, but the present invention is not limited thereto or thereby.

A glass substrate or ceramic substrate or a polymer film is fully or partially coated with a photosensitive paste. The coating can be effected by screen printing or using a bar coater, roller coater, die coater or blade coater, etc. The thickness of the coating can be adjusted by selecting the coating times, the mesh size of the screen and the viscosity of the paste.

When a substrate is coated with a paste, the substrate can be treated on the surface to improve the adhesiveness between the substrate and the coating film. The surface treatment liquid can be a silane coupling agent such as vinyltrichlorosilane, vinyltrimethoxysilane, vinyltriethoxysilane, tris-(2-methoxyethoxy)vinylsilane, γ-glycidoxypropyltrimethoxysilane, γ-(methacryloxypropyl)trimethoxysilane, γ(2-aminoethyl)aminopropyltrimethoxysilane, γ-chloropropyltrimethoxysilane, γ-mercaptopropyltrimethoxysilane or γ-aminopropyltriethoxysilane, or an organic metal such as organic titanium, organic aluminum or organic zirconium. The silane coupling agent or organic metal is diluted to a concentration of 0.1 to 5% by an organic solvent such as ethylene glycol monomethyl ether, ethylene glycol monoethyl ether, methyl alcohol, ethyl alcohol, propyl alcohol or butyl alcohol, etc. Then, the surface treatment liquid is uniformly applied onto the substrate by a spinner, etc., and dried at 80 to 140° C. for 10 to 60 minutes, for surface treatment.

Furthermore, when a film is coated, the coating is dried on the film, to be followed by exposure, or the film is stuck onto a glass or ceramic substrate, to be followed by exposure.

After completion of coating, an exposure apparatus is used for exposure. The exposure is generally effected using a photo mask, as practiced in ordinary photolithography. The mask used can be either of negative type or positive type, depending on the photosensitive organic component used.

Instead of using a photo mask, direct drafting by a red or blue laser beam, etc. can also be adopted.

The exposure apparatus can be a stepper exposure machine or proximity exposure machine, etc. For exposure of a large area, a substrate such as a glass substrate coated with a photosensitive paste can be exposed while being moved, to allow exposure of a large area by an exposure machine with a small exposure area.

The active light source used in this case can be, for example, visible ray, near ultraviolet ray, ultraviolet ray, electron radiation, X radiation, laser beam, etc., and among them, ultraviolet ray is preferable. The light source can be, for example, a low pressure mercury lamp, high pressure mercury lamp, extra-high pressure mercury lamp, halogen lamp or microbicidal lamp, etc. Among them, an extra-high pressure mercury lamp is suitable. Though the exposure conditions depend on the coating thickness, exposure is effected using an extra-high pressure mercury lamp with an output of 1 to 100 mW/cm$^2$ for 20 seconds to 30 minutes.

If an oxygen barrier film is formed on the surface of the applied photosensitive paste, the pattern form can be improved. The oxygen barrier film can be, for example, a film of polyvinyl alcohol (PVA) or cellulose, etc. or a film of a polyester, etc.

The PVA film can be formed by coating a substrate with 0.5 to 5 wt % aqeous solution of PVA uniformly by a spinner, etc., and drying at 70 to 90° C. for 10 to 60 minutes to evaporate water. Furthermore, it is preferable to add a small amount of an alcohol to the aqueous solution, because then the wettability to the insulation film can be enhanced to allow easy evaporation. A more preferable concentration of the PVA solution is 1 to 3 wt %. If the PVA concentration is in this range, the sensitivity can be further enhanced. The reason why the oxygen barrier film improves the sensitivity is postulated to be as described below. It can be considered that when the photosensitive component photoreacts, the oxygen existing in air disturbs the sensitivity of photopolymerizing, but that if the oxygen barrier film is formed, extra oxygen can be intercepted, to improve the sensitivity at the time of exposure.

A transparent film such as a polyester film, polypropylene film or polyethylene film can also be stuck onto the applied photosensitive paste.

After completion of exposure, development is effected by using the difference between the solubility of the photosensitive portions and that of the non-photosensitive portions in the developer. In this case, immersion, showering, spraying or brushing can be used. The developer used can be an organic solvent which can dissolve the organic component in the photosensitive paste. Water can also be added to the organic solvent as far as its dissolving power is not lost. When a compound with an acidic group such as a carboxylic group exists in the photosensitive paste, an aqueous alkali solution can be used for development. The aqueous alkali solution can be an aqueous solution of a metallic alkali such as sodium hydroxide, sodium carbonate or an aqueous calcium hydroxide solution, but it is preferable to use an aqueous solution of an organic alkali because since it is then easy to remove the alkali ingredient at the time of firing.

The organic alkalis which can be used here include general amine compounds such as tetramethylammonium hydroxide, trimethylbenzylammonium hydroxide, monoethanolamine, diethanolamine, etc. The concentration of the aqueous alkali solution is usually 0.01 to 5 wt %, and a more preferable range is 0.1 to 2 wt %. If the alkali concentration is too low, the soluble portions cannot be removed. If too large, the pattern area may be peeled and then undesirably the insoluble portions may be corroded. It is preferable having regard to process control that the development temperature is 20 to 50° C.

Subsequently, firing is effected in a firing furnace. The firing atmosphere and temperature depend on the paste and substrate used, but firing is effected in such an atmosphere of, for example, air, nitrogen or hydrogen, etc. The firing furnace can be a batch type firing furnace or belt type continuous firing furnace.

When a pattern is formed on a glass substrate, firing is effected by heating at a rate of 200 to 400° C./hour and holding at a temperature of 540 to 610° C. for 10 to 60 minutes. The firing temperature chosen is dependent upon the glass powder used, but it is preferable to fire at a suitable temperature at which the pattern is not deformed and at which the grain form of the glass powder does not remain.

If the temperature is lower than the suitable temperature, the porosity and the roughness at the tops of the barrier ribs become large, being likely to shorten the discharge life and undesirably to cause erroneous discharges.

If the temperature is higher than the suitable temperature, the pattern is deformed, causing the tops of the barrier ribs to be round, or to be extremely low in height, and undesirably not allowing the desired height to be obtained.

During the above respective steps of coating, exposure, development and firing, a step of heating at 50 to 300° C. can also be introduced for drying or preliminary reaction.

When the barrier ribs of the present invention are formed, it is preferable to form a buffer layer between the substrate and the barrier ribs because then the adhesiveness of the barrier ribs can be improved to prevent peeling, as compared with the case of forming the barrier ribs directly on the glass substrate.

The buffer layer is formed by coating a glass substrate with a paste consisting of a powder containing a glass as a main ingredient and an organic component, drying it to form a coating film to be a buffer layer, and firing it.

The organic component used for the paste to be the buffer layer can be achieved by adding an organic binder, plasticizer, solvent, and as required, a dispersing agent, leveling agent, etc. The organic binders which can be used here include, for example, polyvinyl alcohol, cellulose based polymers, silicone polymers, polyethylene, polyvinyl pyrrolidone, polystyrene, polyamides, high molecular polyethers, polyvinyl butyral, methacrylates, acrylates, acrylate-methacrylate copolymers, α-methylstyrene polymer, butyl methacrylate resin, etc.

To adjust the viscosity of the paste to be the buffer layer, it is preferable to use a solvent for the binder. The solvent can be methyl cellosolve, ethyl cellosolve, butyl cellosolve, methyl ethyl ketone, dioxane, acetone, cyclohexanone, cyclopentanone, isobutyl alcohol, isopropyl alcohol, tetrahydrofuran, dimethyl sulfoxide, γ-butyrolactone, bromobenzene, chlorobenzne, dibromobenzene, dichlorobenzene, bromobenzoic acid or chlorobenzoic acid, etc., or an organic solvent mixture containing one or more of them.

The paste can also contain a plasticizer. The plasticizers which can be used here include, for example, dibutyl phthalate, dioctyl phthalate, polyethylene glycol and glycerol.

It is preferable that the amount of the glass powder used for the paste to be the buffer layer is 50 to 85 wt % based on the sum of the glass powder and the organic component. If the amount is less than 50 wt %, the reflectance decreases, not allowing the luminance to be obtained because the denseness of the buffer layer and the flatness of the surface are insufficient. If more than 85 wt %, the buffer layer is likely to be cracked due to firing shrinkage.

It is preferable that the thickness of the buffer layer is 3 to 20 $\mu$m, having regard to the uniformity of the buffer layer. A more preferable range is 6 to 15 $\mu$m. If the thickness is more than 20 $\mu$m, it is difficult to remove the solvent at the time of firing, and cracking is likely to occur. Furthermore, since the glass substrate is greatly stressed, the substrate is disadvantageously warped. If less than 3 $\mu$m, it is difficult to maintain a uniform thickness.

The buffer layer usually acts as a dielectric layer after firing. The dielectric layer is limited in the optimum thickness range in relation to the light emission characteristics. Therefore, as required, it is also effective to form a dielectric layer beforehand below the buffer layer, so that a proper thickness can be secured.

It is also effective to add an ultraviolet ray absorber described for the formation of the barrier ribs, particularly an organic dye with a high coefficient of ultraviolet ray absorption in a wavelength range of 350 to 450 nm, to the paste to be the buffer layer. When the barrier ribs are formed by a photosensitive paste, the light reflection of the ground greatly affects the pattern formability. Hence, it is preferable to add an ultraviolet ray absorber, because then the form of the barrier ribs of the present invention can be obtained, being little affected by the light reflection from the buffer layer.

It is preferable that the amount of the organic dye added is 0.05 to 1 wt % based on the weight of the glass powder. If less than 0.05 wt %, a film is likely to remain at the bottoms of the barrier rib pattern, and if more than 1 wt %, then undesirably, peeling is caused at the time of firing because the exposure value required for photo-polymerizing the buffer layer is too large.

It is preferable that the buffer layer is made of a glass, the coefficient of thermal expansion of which in a range of 50 to 400° C. ($\alpha_{50-400}$) is 70 to 85×10$^{-7}$/K, because it then matches with the coefficient of thermal expansion of the substrate glass, thus decreasing the stress acting on the glass substrate at the time of firing. A more preferable range is 72 to $83 \times 10^{-7}$/K. If it exceeds $85 \times 10^{-7}$/K, the substrate is stressed so as to be warped on the side to have the buffer layer formed, and if less than $70 \times 10^{-7}$/K, the substrate is stressed so as to be warped on the side free from the buffer layer. Hence, if the substrate is heated and cooled repetitively, it may be cracked. Furthermore, at the time of sealing with the front substrate, then due to the warping of the glass substrate, both the substrates may not be in parallel and may be incapable of being sealed together.

It is preferable that the glass contained in the buffer layer has a glass transition point Tg of 430 to 500° C., and a softening point Ts of 470 to 580° C. If a material with a glass transition point of higher than 500° C. or a softening point of higher than 580° C. is used for forming the buffer layer, firing at a high temperature is required, and the glass substrate is strained at the time of firing. In the case of a material with a glass transition point of lower than 430° C. or a softening point of lower than 470° C., when the phosphors are applied and fired in later steps, the buffer layer is strained, undesirably not allowing the desired film thickness accuracy to be achieved.

If a glass containing 10 to 85 wt % of at least one of bismuth oxide, lead oxide and zinc oxide is used, it is easy to control the softening point and the coefficient of thermal expansion.

If the amount of the bismuth oxide, lead oxide and zinc oxide exceeds 85 wt %, the heat resistant temperature of the glass is so low as to make it difficult to fire on the glass substrate.

Especially when a glass containing 10 to 85 wt % of bismuth oxide is used as the glass, the pot life of the paste is advantageously long.

As a glass composition containing bismuth oxide, it is preferable to let it contain 50 wt % or more of a composition consisting of the following expressed as oxides;

10 to 70 parts by weight of bismuth oxide 3 to 50 parts by weight of silicon oxide 5 to 40 parts by weight of boron oxide 2 to 30 parts by weight of zinc oxide 3 to 10 parts by weight of zirconium oxide For the buffer layer, it is preferable to use a powder with a grain size distribution of 0.4 to 2 μm in D10 (grain size of 10 vol %), 1 to 3 μm in D50 (grain size of 50 vol %), 3 to 8 μm in D90 (grain size of 90 vol %) and 10 μm or less in the largest grain size. A more preferable grain size distribution is 3 to 5 μm in D90 and 5 μm or less in the largest grain size. If the grain size distribution is in the above ranges, the surface of the buffer layer becomes flat and a dense glass layer is formed after firing, allowing peeling, breaking and meandering of the barrier ribs to be prevented.

If the barrier rib pattern and the buffer layer are fired simultaneously after the barrier rib pattern has been formed on the coating film to be the buffer layer, the binders are removed simultaneously from the buffer layer and the barrier ribs. Hence, the shrinkage stress by the removal of the binder from the barrier ribs can be eased, to prevent peeling and breaking. On the contrary, if the barrier rib pattern is formed on the already fired buffer layer and is fired, peeling and breaking are likely to occur at the time of firing due to insufficient adhesion between the barrier ribs and the buffer layer. If the barrier ribs and the buffer layer are simultaneously fired, the number of steps can be advantageously small.

In the case of simultaneous firing, it is preferable that the coating film to be the buffer layer is formed and subsequently cured, because then the coating film to be the buffer layer is not eroded in the step of forming the barrier rib pattern. As a suitable simple method for hardening the coating film to be the buffer layer, the paste to be the buffer layer is made photosensitive, applied onto the glass substrate, dried, exposed and photo-polymerized.

The paste to be the buffer layer contains at least one photosensitive component selected from photosensitive monomers, photosensitive oligomers and photosensitive polymers, and furthermore as required, contains additives such as a photo polymerization initiator, ultraviolet ray absorber, sensitizer, sensitizing auxiliary and polymerization inhibitor, so as to be photosensitive.

The exposure conditions depend on the kind and amount of the photosensitive component and coating thickness, but exposure is effected using an extra-high pressure mercury lamp with an output of 1 to 100 mW/cm² for 20 seconds to 30 minutes. In this case, if the photo-polymerizing is insufficient, peeling occurs due to uneven hardening at the time of firing. Furthermore, depending on the polymer used, it is eroded by the developer at the time of development to form the barrier rib pattern, and peeling may occur. Therefore, it is important to give a sufficient exposure value for photo-polymerizing The coating film to be the buffer layer can also be cured by thermal polymerization. In this case, for example, a radical polymerizable monomer or radical polymerization initiator is added to the paste to be the buffer layer, and the paste is applied and heated. The radical polymerization monomers which can be used here include, for example, ethylene, styrene, butadiene, vinyl chloride, acrylic acid, methyl acrylate, methyl vinyl ketone, acrylamide, acrylonitrile, etc. The radical initiators which can be used here include benzoyl peroxide, lauroyl peroxide, potassium persulfate, azobisisobutyronitrile, benzoyl peroxide-dimethylaniline, etc.

The coating film to be the buffer layer is not necessarily required to be cured, but as compared with the case of hardening it, the coating film is likely to be eroded by the developer in the step of forming the barrier rib pattern, and the buffer layer is likely to be cracked. Therefore, as the developer, a non-soluble polymer must be selected.

The present invention is described below specifcally with reference to examples, but is not limited thereto or thereby. In the examples of the present invention and comparative examples, each concentration (%) is wt % unless otherwise stated.

The materials used in the examples of the present invention are stated below.

(Glass powder for barrier ribs)
Glass (1)

| | | |
|---|---|---|
| Composition: | \multicolumn{2}{l}{Li$_2$O 9%, SiO$_2$ 20%, B$_2$O$_3$ 31%, BaO 4%, Al$_2$O$_3$ 24%, ZnO 2%, MgO 6%, CaO 4%} |
| Thermal properties: | \multicolumn{2}{l}{Glass transition point 474° C., softening point 515° C., Coefficient of thermal expansion 83 × 10$^{-7}$/K} |
| Grain size: | D10 | 0.9 µm |
| | D50 | 2.5 µm |
| | D90 | 6.5 µm |
| | Largest grain size | 18.5 µm |
| Specific surface area: | 2.56 m$^2$/g | |
| Refractive index: | 1.59 (g-line 436 nm) | |
| Specific gravity: | 2.55 | |

Glass (2):

Composition, thermal properties, refractive index and specific gravity are the same as those of glass (1).

| | | |
|---|---|---|
| Grain size: | D10 | 0.7 µm |
| | D50 | 1.6 µm |
| | D90 | 2.4 µm |
| | Largest grain size | 5.2 µm |
| Specific surface area: | 5.8 m$^2$/g | |

Glass (3):

| | | |
|---|---|---|
| Composition: | \multicolumn{2}{l}{LiO$_2$ 7%, SiO$_2$ 22%, B$_2$O$_3$ 32%, BaO 4%, Al$_2$O$_3$ 22%, ZnO 2%, MgO 6%, CaO 4%} |
| Thermal properties: | \multicolumn{2}{l}{Glass transition point 491° C., softening point 528° C., Coefficient of thermal expansion 74 × 10$^{-7}$/K} |
| Grain size: | D10 | 0.9 µm |
| | D50 | 2.6 µm |
| | D90 | 7.5 µm |
| | Largest grain size | 22.0 µm |
| Specific surface area: | 1.92 m$^2$/g | |
| Refractive index: | 1.59 (g-line 436 nm) | |
| Specific gravity: | 2.54 | |

Glass (4):

Composition and thermal properties are the same as those of glass (3).

| | | |
|---|---|---|
| Grain size: | D10 | 0.8 µm |
| | D50 | 1.5 µm |
| | D90 | 2.5 µm |
| | Largest grain size | 4.6 µm |
| Specific surface area: | 5.9 m$^2$/g | |
| Refractive index: | 1.59 (g-line 436 nm) | |
| Specific gravity: | 2.54 | |

Glass (5):

| | | |
|---|---|---|
| Composition: | \multicolumn{2}{l}{Li$_2$O 4%, K$_2$O 5%, SiO$_2$ 15%, B$_2$O$_3$ 33%, BaO 4%, Al$_2$O$_3$ 20%, ZnO 13%, MgO 1%, CaO 5%} |
| Thermal properties: | \multicolumn{2}{l}{Glass transition point 470° C., softening point 511° C. Coefficient of thermal expansion 76 × 10$^{-7}$/K} |
| Grain size: | D10 | 0.9 µm |
| | D50 | 2.7 µm |
| | D90 | 6.0 µm |
| | Largest grain size | 13.1 µm |
| Specific surface area: | 2.29 m$^2$/g | |
| Refractive index: | 1.58 (g-line 436 nm) | |
| Specific gravity: | 2.67 | |

Glass (6):

| | | |
|---|---|---|
| Composition: | \multicolumn{2}{l}{Bi$_2$O$_3$ 27%, SiO$_2$ 14%, B$_2$O$_3$ 18%, Na$_2$O 2%, BaO 14%, Al$_2$O$_3$ 4%, ZnO 21%} |
| Thermal properties: | \multicolumn{2}{l}{Glass transition point 483° C., softening point 523° C. Coefficient of thermal expansion 79 × 10$^{-7}$/K} |
| Grain size: | D10 | 1.4 µm |
| | D50 | 3.4 µm |
| | D90 | 7.4 µm |
| | Largest grain size | 22.0 µm |
| Specific surface area: | 3.26 m$^2$/g | |
| Refractive index: | 1.73 (g-line 436 nm) | |
| Specific gravity: | 4.13 | |

(Glass powder for buffer layer)
Glass (7):

| | |
|---|---|
| Composition: | Bi$_2$O$_3$ 38%, SiO$_2$ 7%, B$_2$O$_3$ 19%, BaO 12%, Al$_2$O$_3$ 14%, Al$_2$O$_3$ 4%, ZnO 21% |
| Thermal properties: | Glass transition point 475° C., softening point 515° C. Coefficient of thermal expansion 75 × 10$^{-7}$/K |

-continued

| | | |
|---|---|---|
| Grain size: | D10 | 0.9 μm |
| | D50 | 2.5 μm |
| | D90 | 3.9 μm |
| | Largest grain size | 6.5 μm |
| Specific gravity: | 4.61 | |

Glass (8):

| | | |
|---|---|---|
| Composition: | $Bi_2O_3$ 67%, $SiO_2$ 10%, $B_2O_3$ 12%, $Al_2O_3$ 3%, ZnO 3%, $ZrO_2$ 5% | |
| Thermal properties: | Glass transition point 455° C., softening point 484° C. Coefficient of thermal expansion 77 × $10^{-7}$/K | |
| Grain size: | D10 | 0.4 μm |
| | D50 | 2.0 μm |
| | D90 | 5.2 μm |
| | Largest grain size | 9.5 μm |
| Specific gravity: | 5.35 | |

(Filler)
Filler (1): High melting point glass powder

| | | |
|---|---|---|
| Composition: | $SiO_2$ 38%, $B_2O_3$ 10%, BaO 5%, CaO 4%, $Al_2O_3$ 36%, ZnO 2%, $MgO_2$ 5% | |
| Thermal properties: | Glass transition point 652° C., softening point 746° C. Coefficient of thermal expansion 43 × $10^{-7}$/K | |
| Grain size: | D10 | 0.1 μm |
| | D50 | 2.4 μm |
| | D90 | 4.7 μm |
| | Largest grain size | 10.0 μm |
| Specific surface area: | 4.17 $m^2$/g | |
| Refractive index: | 1.59(g-line 436 nm) | |
| Specific gravity: | 2.53 | |

Tinania: Trade name TIPAQUE R550 produced by Ishihara Sangyo Kaisha, Ltd., powder with an average grain size of 0.24 μm
Barium titanate: Product Code No. 219-9 produced by Mitsui Mining Co., Ltd., powder with an average grain size of 1.5 μm (Polymer)
Polymer (1):

γ-butyrolactone solution containing 40% of a photosensitive polymer with a weight average molecular weight of 43000 and an acid value of 95, obtained by letting 0.4 equivalent of glycidyl methacrylate (GMA) addition-react with each equivalent of carboxyl groups of a copolymer consisting of 40% of methacrylic acid (MAA), 30% of methyl methacrylate (MMA) and 30% of styrene (St)

Polymer (2):

γ-butyrolactone solution containing a photosensitive polymer with a weight average molecular weight of 18000 and an acid value of 100 and identical with the polymer (1) in structure Polymer (3):

γ-butyrolactone solution containing 40% of a photosensitive polymer with a weight average molecular weight of 30000 and an acid value of 50, obtained by letting 0.8 equivalent of glycidyl methacrylate (GMA) addition-react with each equivalent of carboxyl groups of a copolymer consisting of 40% of methacrylic acid (MAA), 30% of methyl methacrylate (MMA) and 30% of styrene (St)

EC: Terpineol solution containing 6% of ethyl cellulose with a substitution degree of 1.5 and an average molecular weight of 50000

(Monomer)

Monomer (1): $X_2$—N—$CH_2$—Ph—$CH_2$—N—$X_2$

X: —$CH_2$—CH(OH)—$CH_2$O—CO—C($CH_3$)=$CH_2$

Monomer (2): $X_2$—N—CH($CH_3$)—$CH_2$—(O—$CH_2$—CH($CH_3$))n-N—$X_2$

X: —$CH_2$—CH(OH)—$CH_2$O—CO—C($CH_3$)=$CH_2$
n = 2 to 10

Monomer (3): Trimethylolpropane triacrylate modified PO (Photo polymerization initiator)
IC-369: Irgacure-369 (produced by Ciba Geigy)

2-benyzl-2-dimethylamino-1-(4-morpholinophenyl)butanone-1

IC-907: Irgacure-907 (produced by Ciba Geigy)

2-methyl-1-4-(methylthio)phenyl-2-morpholinopropanone (Sensitizer)
DETZ-S: 2,4-diethylthioxanthone -continued

| | |
|---|---|
| (Sensitizing auxiliary) | |
| EPA: | Ethyl p-dimethylaminobenzoate |
| (Plasticizer) | |
| DBP: | Dibutyl phthalate (DBP) |
| (Thickener) | |
| SiO: | 15% $SiO_2$ 2-(2-butoxyethoxy)ethyl acetate solution |
| (Organic dye) | |
| Sudan: | Azo organic dye, chemical formula $C_{24}H_{20}N_4O$, molecular weight 380.45 |

EXAMPLE 1

A photosensitive paste to form barrier ribs, composed as shown in Table 1 was produced. Seventy parts by weight of a glass powder (glass (1)) and 0.08 part by weight of an organic dye (Sudan) were weighed. Sudan was dissolved into acetone, and a dispersing agent was added. The mixture was homogeneously stirred by a homogenizer. Into the solution, the glass powder was added, and the mixture was homogeneously dispersed and mixed, and dried at 100° C. using a rotary evaporator, to evaporate acetone. Thus, a powder in which the glass grains were uniformly coated on the surfaces with an organic dye film was produced.

A polymer, monomer, photo polymerization initiator and sensitizer were mixed at a ratio shown in Table 1, and dissolved homogeneously. Then, the solution was filtered using a 400-mesh filter, to produce an organic vehicle.

The organic vehicle and said glass powder were added at a ratio shown in Table 1, and the mixture was mixed and dispersed by a three-roller mill, to produce a photosensitive paste to form the barrier ribs. The refractive index of the organic component was 1.59, and that of the glass powder was 1.59.

A photosensitive paste to form the buffer layer, composed as shown in Table 2 was produced by similar operation.

The paste to form the buffer layer was uniformly applied onto an A4 size PD-200 substrate produced by Asahi Glass and having electrodes and dielectric layer formed beforehand, by screen printing using a 325-mesh screen. Then, it was kept at 80° C. for 40 minutes, to be dried. The thickness after drying was 15 µm.

In succession, the coating film was exposed to ultraviolet ray by an extra-high pressure mercury lamp with an output of 50 $mJ/cm^2$. The exposure value was 4 $J/cm^2$.

The coating film to be the buffer layer was uniformly coated with said photosensitive paste to form the barrier ribs by screen printing using a 325-mesh screen. To avoid the formation of pin holes, etc. in the coating film, coating and drying were repeated several times, to adjust the film thickness. Intermediate drying was effected at 80° C. for 10 minutes. Then, the coating film was kept at 80° C. for 1 hour, to be dried. The thickness after drying was 170 µm.

In succession, the coating film was irradiated with ultraviolet ray by an extra-high pressure mercury lamp with an output of 50 $mJ/cm^2$ through a negative chromium mask of 140 µm pitch. The exposure value was 0.7 $J/cm^2$.

Then, 0.2 wt % aqueous solution monoethanolamine kept at 35° C. was showered for 170 seconds for development, and the developed film was washed by water using a shower spray. As a result, the portions not photo-polymerized were removed, and a striped barrier rib pattern was formed on the glass substrate.

The glass substrate with the barrier rib pattern formed was fired at 560° C. in air for 15 minutes, to form barrier ribs.

In the predetermined grooves between the barrier ribs of the glass substrate with the barrier ribs formed, a phosphor layer was formed by the photosensitive paste method. That is, three photosensitive fluorescent pastes of red, green and blue were produced, and for each paste, printing, drying, exposure through a photo mask and development were effected, to form a phosphor pattern at predetermined positions. This operation was effected for the respective colors, and the respective phosphor patterns were fired all at once at 500° C. for 20 minutes, to form a phosphor layer. Thus, a rear plate for PDP could be obtained.

The sectional forms of the formed barrier ribs were observed by a scanning electron microscope (S-2400 produced by Hitachi, Ltd.). In the case of forms shown in FIGS. 2, 4, 6 and 7, the width at the top, the width at the center in height and the width at the bottom were measured, and when it was difficult to measure the width at the top and the width at the bottom as in the case of forms shown in FIGS. 3 and 8, L90 and L10 were measured respectively instead of the width at the top and the width at the bottom. Furthermore when the bottom has a radius formed as shown in FIG. 4, the radius of curvature was also measured. Each value was the average value of three samples. The form of this example was as shown in FIG. 4.

Furthermore, the deflection of the barrier rib in a length of 1 mm along the barrier rib was measured. Also the average value of three samples was adopted. From the above SEM observation, the thickness of the buffer layer was measured. The true density of the barrier rib material and the measured density of the barrier ribs were measured according to the Archimedes method, to calculate the porosity.

As for the defects of the barrier ribs and the phosphor layer, (1) the falling and peeling of the barrier ribs before firing, (2) the peeling and breaking of the barrier ribs after firing and (3) the coating uniformity of the phosphor layer were evaluated. A case free from any defect was expressed by o. The open width ratio of each barrier rib was defined as 1—(the width at the center in height/pitch), and calculated.

The results are shown in Table 3. The barrier ribs were free from peeling, falling and breaking before and after firing, and the coating uniformity of the phosphors was also excellent.

A front plate provided with electrodes, dielectric and protective layer beforehand and said rear plate were provided with a low melting point glass paste used as a sealant, and positioned to face each other in a predetermined arrangement, and treated at 450° C. for 30 minutes for sealing. Then, the display region was internally evacuated, and a mixed gas consisting of 99% of He and 1% of Xe was injected, to complete a plasma display panel. Its light emission characteristics were examined. A case free from any problem in luminance irregularity and high luminance was expressed by o. The results are shown in Table 3. The panel had excellent characteristics with little luminance irregularity and high luminance.

EXAMPLE 2

An examination was performed as described in Example 1, except that the composition of the paste to form the barrier ribs was changed as shown in Table 1 and that the exposure value was 1 J/cm². The results are shown in Table 3.

EXAMPLE 3

An examination was performed as described in Example 1, except that the composition of the paste to form the barrier ribs was changed as shown in Table 1 and that the exposure value was 1 J/cm². The results are shown in Table 3.

EXAMPLE 4

An examination was performed as described in Example 1, except that the composition of the paste to form the barrier ribs was changed as shown in Table 1, that the coating thickness of the paste to form the barrier ribs was 150 μm, that the exposure value was 0.3 J/cm² and that the development time was 150 seconds. The results are shown in Table 3.

EXAMPLE 5

An examination was performed as described in Example 1, except that the composition of the paste to form the barrier ribs was changed as shown in Table 1, that the coating thickness of the paste to form the barrier ribs was 150 μm, that the exposure value was 0.6 J/cm2 and that the development time was 150 seconds. The results are shown in Table 3.

EXAMPLE 6

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 150 μm, that its exposure value was 1.5 J/cm² and that the development time was 150 seconds. The results are shown in Table 3.

EXAMPLE 7

An examination was performed as described in Example 1, except that the composition of the paste to form the barrier ribs was changed as shown in Table 1, that the composition of the paste to form the buffer layer was changed as shown in Table 2, that the coating thickness of the paste to form the buffer layer was 20 μm, that its exposure value was 5 J/cm², that the coating thickness of the paste to form the barrier ribs was 150 μm, that its exposure value was 1.2 J/cm² and that the development time was 150 seconds. The results are shown in Table 3.

EXAMPLE 8

An examination was performed as described in Example 1, except that the composition of the paste to form the barrier ribs was changed as shown in Table 1, that the composition of the paste to form the buffer layer was changed as shown in Table 2, that the coating thickness of the paste to form the buffer layer was 20 μm, that its exposure value was 5 J/cm², that the coating thickness of the paste to form the barrier ribs was 190 μm, that the development time was 200 seconds and that the firing temperature was 580° C. The results are shown in Table 3.

EXAMPLE 9

An examination was performed as described in Example 1, except that the composition of the paste to form the barrier ribs was changed as shown in Table 1, that the composition of the paste to form the buffer layer was changed as shown in Table 2, that the coating thickness of the paste to form the buffer layer was 20 μm, that its exposure value was 4 J/cm² and that the firing temperature of the barrier rib pattern was 580° C. The results are shown in Table 3.

EXAMPLE 10

An examination was performed as described in Example 1, except that the composition of the paste to form the barrier ribs was changed as shown in Table 1, that the composition of the paste to form the buffer layer was changed as shown in Table 2 into a non-photosensitive paste, that its coating thickness was 36 μm, that the coating thickness of the paste to form the barrier ribs was 230 μm, that the pitch of the photo mask for the barrier ribs was 150 μm, that the development time was 230 seconds and that the firing temperature was 580° C. The results are shown in Table 3.

EXAMPLE 11

An examination was performed as described in Example 1, except that the composition of the paste to form the barrier ribs was changed as shown in Table 1, that the coating thickness of the paste to form the buffer layer was 36 μm, that its exposure value was 10 J/cm², that the coating thickness of the paste to form the barrier ribs was 140 μm, that the pitch of the photo mask for the barrier ribs was 150 μm, that the exposure was 1.2 J/cm², that the development time was 150 seconds and that the firing temperature was 580° C. The results are shown in Table 3.

EXAMPLE 12

An examination was performed as described in Example 1, except that the composition of the paste to form the barrier ribs was changed as shown in Table 1, that the coating thickness of the paste to form the buffer layer was 36 μm, that its exposure value was 10 J/cm², that the coating thickness of the paste to form the barrier ribs was 230 μm, that the pitch of photo mask for the barrier ribs was 150 μm, that the exposure value was 0.5 J/cm², that the development time was 230 seconds and that the firing temperature was 580° C. The results are shown in Table 3.

EXAMPLE 13

An examination was performed as described in Example 1, except that the composition of the paste to form the barrier ribs was changed as shown in Table 1, that the pitch of the photo mask for the barrier ribs was 100 μm, that the exposure wavelength was g-line (436 nm) only, that the exposure value was 0.8 J/cm² and that the firing temperature was 580° C. The results are shown in Table 3.

EXAMPLE 14

An examination was performed as described in Example 1, except that the composition of the paste for the barrier ribs was changed as shown in Table 1, that the coating thickness of the paste for the barrier ribs was 200 μm, that the pitch of the photo mask for the barrier ribs was 150 μm, that the exposure value was 0.7 J/cm², that the development time was 200 seconds and that the firing temperature was 580° C. The results are shown in Table 3.

EXAMPLE 15

An examination was performed as described in Example 1, except that the composition of the paste to form the barrier ribs was changed as shown in Table 1, that the coating thickness of the paste to form the barrier ribs was 230 μm, that the pitch of the photo mask for the barrier ribs was 230 μm, that the exposure value was 1.2 J/cm², that the development time was 230 seconds and that the firing temperature was 580 ° C. The results are shown in Table 3.

EXAMPLE 16

An examination was performed as described in Example 1, except that the composition of the paste to form the barrier ribs was changed as shown in Table 1, that the coating thickness of the paste to form the barrier ribs was 210 μm, that the exposure value of the barrier rib pattern was 0.9 J/cm², that the development time was 200 seconds and that the firing temperature was 580° C. The results are shown in Table 3.

EXAMPLE 17

An examination was performed as described in Example 1, except that the composition of the paste to form the barrier ribs was changed as shown in Table 1, that the exposure value of the barrier rib pattern was 0.7 J/cm² and that the firing temperature was 580° C. The results are shown in Table 3.

EXAMPLE 18

An examination was performed as described in Example 1, except that the composition of the paste to form the barrier ribs was changed as shown in Table 1, that the coating thickness of the paste to form the barrier ribs was 200 μm, that its exposure value was 0.9 J/cm², that the development time was 200 seconds and that the firing temperature was 580° C. The results are shown in Table 3.

EXAMPLE 19

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 130 μm, that the pitch of the photo mask for the barrier ribs was 150 μm, that the exposure value was 0.6 J/cm², that the development time was 100 seconds and that the firing temperature was 580° C. The results are shown in Table 3.

EXAMPLE 20

An examination was performed as described in Example 1, except that the composition of the paste to form the barrier ribs was changed as shown in Table 1, that the coating thickness of the paste to form the buffer layer was 20 μm, that its exposure value was 5 J/cm², that the pitch of the photo mask for the barrier ribs was 150 μm, that the exposure was 0.7 J/cm² and that the firing temperature was 570° C. The results are shown in Table 3.

EXAMPLE 21

An examination was performed as described in Example 1, except that the composition of the paste to form the barrier ribs was changed as shown in Table 1, that the coating thickness of the paste to form the buffer layer was 20 μm, that its exposure was 5 J/cm², that the coating thickness of the paste to form the barrier ribs was 150 μm, that the pitch of the photo mask for the barrier ribs was 150 μm, that the exposure value was 0.6 J/cm², that the development time was 150 seconds and that the firing temperature was 570° C. The results are shown in Table 3.

EXAMPLE 22

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 160 μm, that the pitch of the photo mask for the barrier ribs was 150 μm, that the exposure was 0.7 J/cm², that the development time was 160 seconds and that the firing temperature was 570° C. The results are shown in Table 3.

EXAMPLE 23

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 230 μm, that the pitch of the photo mask for the barrier ribs was 230 μm, that the exposure value was 1.3 J/cm², that the development time was 230 seconds and that the firing temperature was 580° C. The results are shown in Table 3.

EXAMPLE 24

An examination was performed as described in Example 1, except that the composition of the paste to form the barrier ribs was changed as shown in Table 1, that the coating thickness of the paste to form the buffer layer was 36 μm, that its exposure value was 10 J/cm², that the coating thickness of the paste to form the barrier ribs was 150 μm, that the pitch of the photo mask for the barrier ribs was 150 μm, that the exposure value was 0.6 J/cm², that the development time was 150 seconds and that the firing temperature was 560° C. The results are shown in Table 3.

Comparative Example 1

An examination was performed as described in Example 1, except that the composition of the paste to form the barrier ribs was changed as shown in Table 1, that the coating thickness of the paste to form the buffer layer was 36 μm, that its exposure value was 10 J/cm², that the coating thickness of the paste to form the barrier ribs was 150 μm, that the pitch of the photo mask for the barrier ribs was 150 μm, that the exposure value was 0.6 J/cm², that the development time was 150 seconds and that the firing temperature was 560° C.

The results are shown in Table 3. Since the grain size of the glass powder for the barrier ribs was too small, irradiation did not reach the bottoms of the barrier ribs, and the barrier ribs were more than 1 in Lt/Lh and less than 1 in Lb/Lh, and fell considerably and peeled.

Comparative Example 2

An examination was performed as described in Example 1, except that the composition of the paste to form the barrier ribs was changed as shown in Table 1, that the coating thickness of the paste to form the buffer layer was 10 μm, that its exposure value was 3 J/cm², that the coating thickness of the paste to form the barrier ribs was 190 μm, that the pitch of the photo mask for the barrier ribs was 150 μm, that the exposure value was 0.1 J/cm², that the development time was 200 seconds and that the firing temperature was 580° C.

The results are shown in Table 3. The paste to form the barrier ribs composed like this could form only barrier ribs of more than 1 in L90/Lh and more than 2 in L10/Lh. The barrier ribs meandered greatly, and the luminance irregularity was large.

Comparative Example 3

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 130 μm, that the pitch of the photo mask for the barrier ribs was 150 μm, that the exposure value was 0.2 J/cm², that the development time was 120 seconds and that the firing temperature was 580° C.

The results are shown in Table 3. Since the amount of the organic dye added was small, the barrier ribs were more than 2 in Lb/Lh, and the luminance was low.

Comparative Example 4

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 150 μm, that the pitch of the photo mask for the barrier ribs was 150 μm and that the development time was 160 seconds.

The results are shown in Table 3. Since the glass powder content in the paste to form the barrier ribs was large, the irradiation did not reach the bottoms of the barrier ribs, and the barrier ribs were less than 0.65 in Lt/Lh and less than 1 in Lb/Lb, and fell. Furthermore, the luminance was low.

Comparative Example 5

An examination was performed as described in Example 1, except that the composition of the paste to form the barrier ribs was changed as shown in Table 1, that the coating thickness of the paste to form the buffer layer was 20 μm, that its exposure value was 5 J/cm², that the coating thickness of the paste to form the barrier ribs was 75 μm, that the pitch of the photo mask for the barrier ribs was 150 μm, that the exposure was 0.6 J/cm² and that the development time was 50 seconds.

The results are shown in Table 3. Since the glass powder content in the paste to form the barrier ribs was small, the barrier ribs were more than 2 in L10/Lh, and the luminance was low.

Comparative Example 6

An examination was performed as described in Example 1, except that the composition of the paste to form the barrier ribs was changed as shown in Table 1, that the coating thickness of the paste to form the buffer layer was 30 μm, that its exposure value was 8 J/cm², that the coating thickness of the paste to form the barrier ribs was 90 μm, that the pitch of the photo mask for the barrier ribs was 150 μm, that the exposure was 0.6 J/cm², that the development time was 70 seconds and that the firing temperature was 570° C.

The results are shown in Table 3. The refractive index of the glass powder in the paste to form the barrier ribs was 1.73 and the refractive index of the organic component was 1.59. Since the matching in refractive index was poor, the exposure did not work, and the barrier ribs were more than 1 in Lt/Lh, and meandered greatly. Luminance irregularity was also large.

Comparative Example 7

An examination was performed as described in Example 1, except that the composition of the paste to form the barrier ribs was changed as shown in Table 1, that the coating thickness of the paste to form the barrier ribs was 100 μm, that the exposure value was 0.6 J/cm² and that the development time was 90 seconds.

The results are shown in Table 3. Since the grain size of the glass powder for the barrier ribs was small, irradiation did not reach the bottoms of the barrier ribs, and the barrier ribs were less than 1 in Lb/Lh, and fell and peeled considerably.

Comparative Example 8

An examination was performed as described in Example 1, except that the composition of the paste to form the barrier ribs was changed as shown in Table 1, that the coating thickness of the paste to form the barrier ribs was 100 μm, that the pitch of the photo mask for the barrier ribs was 150 μm, that the exposure value was 3 J/cm², that the development time was 100 seconds and that the firing temperature was 570° C.

The results are shown in Table 3. Since the amount of the organic dye was large, the barrier ribs were less than 1 in Lb/Lh and fell, and the luminance was low.

Comparative Example 9

An examination was performed as described in Example 1, except that the composition of the paste to form the barrier ribs was changed as shown in Table 1, that no buffer layer was formed, that the coating thickness of the paste to form the barrier ribs was 150 μm, that the exposure value was 0.7 J/cm² and that the firing temperature was 500° C.

le;.5qThe results are show in Table 3. Since no buffer layer was formed, peeling was considerable. Furthermore, since the firing temperature was low, the barrier ribs were more than 2 in Lb/Lh.

Comparative Example 10

An examination was performed as described in Example 1, except that the composition of the paste to form the barrier ribs was changed as shown in Table 1, that the coating thickness of the paste to form the buffer layer was 10 μm, that its exposure value was 3 J/cm², that the coating thickness of the paste to be the barrier ribs was 180 μm, that the pitch of the photo mask for the barrier ribs was 230 μm, that the development time was 190 seconds and that the firing temperature was 580° C.

The results are shown in Table 3. Since the amounts of the photo polymerization initiator and the sensitizer added were small, exposure did not work, and the barrier ribs were less than 0.65 in Lt/Lh and less than 1 in Lb/Lh and fell. The luminance irregularity was large.

TABLE 1-1

Composition of photosensitive pastes to form barrier ribs

|  |  | Example 1 | Example 2 | Example 3 | Example 4 | Example 5 | Example 6 |
|---|---|---|---|---|---|---|---|
| Glass powder | Glass (1) | 70 | 70 | 70 | 70 | 70 | 70 |
| Organic dye | Sudan | 0.08 | 0.08 | 0.08 | 0.05 | 0.1 | 0.13 |
| Polymer | Polymer (1) | 37.5 | 37.5 | 37.5 | 37.5 | 37.5 | 37.5 |
| Monomer | Monomer (2) | 12.75 | 12.75 | 12.75 | 12.75 | 12.75 | 12.75 |
| Initiator | IC-369 | 4.8 | 2.4 | 1.8 | 4.8 | 4.8 | 4.8 |
| Sensitizer | DETX-S | 4.8 | 2.4 | 3.6 | 4.8 | 4.8 | 4.8 |

|  |  | Example 7 | Example 8 | Example 9 | Example 10 | Example 11 | Example 12 |
|---|---|---|---|---|---|---|---|
| Glass powder | Glass (1) | 70 | — | — | — | — | — |
|  | Glass (3) | — | 70 | 70 | 70 | 70 | 70 |
| Organic dye | Sudan | 0.08 | 0.08 | 0.08 | 0.08 | 0.08 | 0.08 |
| Polymer | Polymer (1) | 50 | 37.5 | 37.5 | 37.5 | 50 | 25 |
| Monomer | Monomer (1) | — | — | — | 12 | 8 | 16 |
|  | Monomer (2) | 8.5 | 12.75 | 12.75 | — | — | — |
| Initiator | IC-369 | 4.8 | 2.4 | 4.8 | 4.8 | 4.8 | 4.8 |
| Sensitizer | DETX-S | 4.8 | 2.4 | 4.8 | 4.8 | 4.8 | 4.8 |

|  |  | Example 13 | Example 14 | Example 15 | Example 16 | Example 17 | Example 18 |
|---|---|---|---|---|---|---|---|
| Glass powder | Glass (1) | — | — | — | — | — | 56 |
|  | Glass (3) | 70 | 65 | 80 | 70 | 70 | — |
| Filler | Filler (1) | — | — | — | — | — | 14 |
| Organic dye | Sudan | 0.08 | 0.08 | 0.08 | 0.08 | 0.08 | 0.08 |
| Polymer | Polymer (1) | 37.5 | 43.75 | 25 | — | — | 37.5 |
|  | Polymer (2) | — | — | — | — | 37.5 | — |
|  | Polymer (3) | — | — | — | 37.5 | — | — |
| Monomer | Monomer (2) | 12.75 | 14.88 | 8.5 | 12.75 | 12.75 | 12.75 |
| Initiator | IC-369 | 4.8 | 5.6 | 3.2 | 4.8 | 4.8 | 4.8 |
| Sensitizer | DETX-S | 4.8 | 5.6 | 3.2 | 4.8 | 4.8 | 4.8 |

TABLE 1-2

Compositions of photosensitive pastes to form barrier ribs

|  |  | Example 19 | Example 20 | Example 21 | Example 22 | Example 23 | Example 24 |
|---|---|---|---|---|---|---|---|
| Glass powder | Glass (1) | 56 | 56 | 66.5 | 63 | — | — |
|  | Glass (3) | — | — | — | — | 85 | — |
|  | Glass (5) | — | — | — | — | — | 70 |
| Filler | Filler (1) | — | — | — | — | — | — |
|  | Titania | 14 | — | 3.5 | 7 | — | — |
|  | Barium titanate | — | 14 | — | — | — | — |
| Organic dye | Sudan | 0.08 | 0.08 | 0.08 | 0.08 | 0.08 | 0.08 |
| Polymer | Polymer (1) | 37.5 | 37.5 | 37.5 | 37.5 | 18.75 | 37.5 |
| Monomer | Monomer (2) | 12.75 | 12.75 | 12.75 | 12.75 | 6.38 | 12.75 |
| Initiator | IC-369 | 4.8 | 4.8 | 4.8 | 4.8 | 2.4 | 4.8 |
| Sensitizer | DETX-S | 4.8 | 4.8 | 4.8 | 4.8 | 2.4 | 4.8 |

|  |  | Comparative Example 1 | Comparative Example 2 | Comparative Example 3 | Comparative Example 4 | Comparative Example 5 | Comparative Example 6 |
|---|---|---|---|---|---|---|---|
| Glass powder | Glass (1) | — | 70 | — | 90 | 60 | — |
|  | Glass (3) | — | — | 70 | — | — | — |
|  | Glass (4) | 70 | — | — | — | — | — |
|  | Glass (6) | — | — | — | — | — | 70 |
| Organic dye | Sudan | 0.08 | 0.08 | 0.03 | 0.08 | 0.08 | 0.08 |
| Polymer | Polymer (1) | 37.5 | 37.5 | 37.5 | 12.5 | 50 | 37.5 |
| Monomer | Monomer (2) | 12.75 | — | 12.75 | 4.25 | 17 | 12.75 |
|  | Monomer (3) | — | 12.75 | — | — | — | — |
| Initiator | IC-369 | 2.4 | 4.8 | 4.8 | 4.8 | 4.8 | 2.4 |
| Sensitizer | DETX-S | 2.4 | 0 | 4.8 | 4.8 | 4.8 | 2.4 |

|  |  | Comparative Example 7 | Comparative Example 8 | Comparative Example 9 | Comparative Example 10 |
|---|---|---|---|---|---|
| Glass powder | Glass (2) | 70 | — | — | — |
|  | Glass (3) | — | 70 | 70 | 70 |
| Organic dye | Sudan | 0.08 | 2 | 0.08 | 0.08 |
| Polymer | Polymer (1) | 37.5 | 37.5 | 37.5 | 37.5 |
| Monomer | Monomer (2) | 12.75 | 12.75 | 12.75 | 12.75 |

TABLE 1-2-continued

Compositions of photosensitive pastes to form barrier ribs

| Initiator | IC-369 | 4.8 | 4.8 | 4.8 | 0.8 |
|---|---|---|---|---|---|
| Sensitizer | DETX-S | 4.8 | 0 | 4.8 | 0.8 |

TABLE 2

Compositions of pastes to form buffer layer

| | | Example 1–6 | Example 7 | Example 8 | Example 9 | Example 10 | Example 11–20 Comparative Example 1–8, 10 |
|---|---|---|---|---|---|---|---|
| Glass powder | Glass (7) | 85 | 58.2 | — | 85 | 58.2 | 85 |
| | Glass (8) | — | — | 85 | — | — | — |
| Filler | Titania | — | — | — | — | 5.7 | — |
| | Barium titanate | — | 5.7 | — | — | — | — |
| Organic dye | Sudan | 0.1 | 0.1 | 0.2 | 0.05 | 0.15 | 0.1 |
| Polymer | Polymer (1) | 25 | 25 | — | 25 | — | 25 |
| | Polymer (3) | — | — | 25 | — | — | — |
| | EC | — | — | — | — | 25.7 | — |
| Monomer | Monomer (3) | 5 | 5 | 5 | 5 | — | 5 |
| Initiator | IC-907 | 2 | 2 | 2 | 2 | — | 2 |
| Sensitizer | DETX-S | 2 | 2 | 2 | 2 | — | 2 |
| Sensitizing auxiliary | EPA | 1 | 1 | 1 | 1 | — | 1 |
| Plasticizer | DBP | 1.7 | 1.7 | 1.7 | 1.7 | — | 1.7 |
| Thickener | SiO | 4 | 4 | 4 | 4 | 4.1 | 4 |
| Solvent | γ-BL | 9 | 9 | 9 | 9 | 6.3 | 9 |

TABLE 3-1

Figure 6:
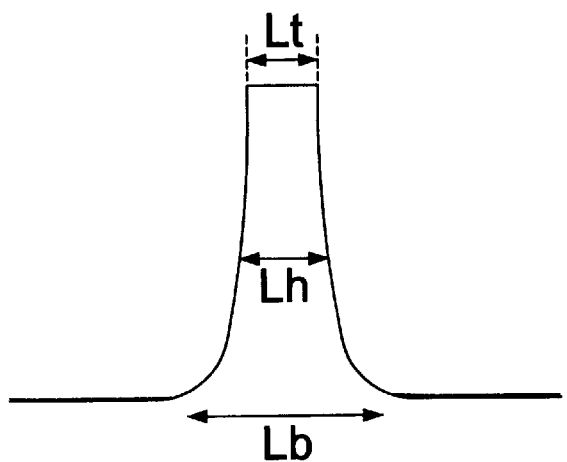

| Results | | | | | | |
|---|---|---|---|---|---|---|
| | Example 1 | Example 2 | Example 3 | Example 4 | Example 5 | Example 6 |
| Form | FIG. 4 | FIG. 3 | FIG. 3 | FIG. 6 | FIG. 4 | FIG. 2 |
| Pitch ($\mu$m) | 140 | 140 | 140 | 140 | 140 | 140 |
| Width at top Lt ($\mu$m) | 33 | — | — | 32 | 30 | 30 |
| L90 ($\mu$m) | — | 21 | 33 | — | — | — |
| Width Lh ($\mu$m) | 34 | 21 | 35 | 34 | 33 | 32 |
| L10 ($\mu$m) | — | 33 | 54 | — | — | — |
| Width at bottom Lb ($\mu$m) | 50 | — | — | 68 | 42 | 35 |
| Deflection Ld ($\mu$m) | 35 | 26 | 37 | 35 | 33 | 32 |
| Lt/Lh | 0.97 | — | — | 0.94 | 0.91 | 0.94 |
| L90/Lh | — | 1.0 | 0.94 | — | — | — |
| Lb/Lh | 1.47 | — | — | 2.0 | 1.27 | 1.09 |
| L10/Lh | — | 1.57 | 1.54 | — | — | — |
| Ld/Lt | 1.06 | — | — | 10.9 | 1.1 | 1.17 |
| Ld/L90 | — | 1.23 | 1.05 | — | — | — |
| Height of barrier ribs ($\mu$m) | 123 | 117 | 120 | 100 | 102 | 98 |
| Radius of curvature ($\mu$m) | 8 | — | — | — | 6 | — |
| Lh/2 ($\mu$m) | 17 | — | — | — | 17 | — |
| Defects of barrier ribs before firing | ○ | ○ | ○ | ○ | ○ | ○ |
| Defects of barrier ribs after firing | ○ | ○ | ○ | ○ | ○ | ○ |
| Defects of phosphor coating | ○ | ○ | ○ | ○ | ○ | ○ |
| Open width ratio | 0.77 | 0.85 | 0.75 | 0.75 | 0.76 | 0.78 |
| Thickness of buffer layer ($\mu$m) | 7 | 7 | 7 | 7 | 7 | 10 |
| Porosity (%) | 1.3 | 1.7 | 2.5 | 1.0 | 1.5 | 1.7 |
| Light emission characteristics | ○ | ○ | ○ | ○ | ○ | ○ |
| | Example 7 | Example 8 | Example 9 | Example 10 | Example 11 | Example 12 |
| Form | FIG. 6 | FIG. 6 | FIG. 6 | FIG. 2 | FIG. 6 | FIG. 6 |
| Pitch ($\mu$m) | 140 | 140 | 140 | 150 | 150 | 150 |
| Width at top Lt ($\mu$m) | 29 | 25 | 23 | 27 | 25 | 25 |
| L90 ($\mu$m) | — | — | — | — | — | — |
| Width Lh ($\mu$m) | 33 | 27 | 23 | 30 | 32 | 38 |
| L10 (m) | — | — | — | — | — | — |
| Width at bottom Lb ($\mu$m) | 65 | 50 | 46 | 40 | 50 | 50 |
| Deflection Ld ($\mu$m) | 33 | 27 | 23 | 28 | 25 | 30 |
| Lt/Lh | 0.88 | 0.93 | 1.0 | 0.9 | 0.78 | 0.66 |
| L90/Lh | — | — | — | — | — | — |
| Lb/Lh | 1.97 | 1.85 | 2.0 | 1.33 | 1.56 | 1.32 |
| L10/Lh | — | — | — | — | — | — |
| Ld/Lt | 1.14 | 1.08 | 1.0 | 1.04 | 1.0 | 1.2 |
| Ld/L90 | — | — | — | — | — | — |
| Height of barrier ribs ($\mu$m) | 103 | 130 | 120 | 165 | 86 | 160 |
| Radius of curvature ($\mu$m) | — | — | — | — | — | — |
| Lh/2 ($\mu$m) | — | — | — | — | — | — |
| Defects of barrier ribs before firing | ○ | ○ | ○ | ○ | ○ | ○ |
| Defects of barrier ribs after firing | ○ | ○ | ○ | ○ | ○ | ○ |
| Defects of phosphor coating | ○ | ○ | ○ | ○ | ○ | ○ |
| Open width ratio | 0.76 | 0.81 | 0.84 | 0.8 | 0.79 | 0.75 |
| Thickness of buffer layer ($\mu$m) | 10 | 10 | 10 | 18 | 18 | 18 |
| Porosity (%) | 2.7 | 1.0 | 1.3 | 3 | 3.2 | 5 |
| Light emission characteristics | ○ | ○ | ○ | ○ | ○ | ○ |

TABLE 3-2

| Results | | | | | | |
|---|---|---|---|---|---|---|
| | Example 13 | Example 14 | Example 15 | Example 16 | Example 17 | Example 18 |
| Form | FIG. 2 | FIG. 3 | FIG. 2 | FIG. 6 | FIG. 6 | FIG. 6 |
| Pitch ($\mu$m) | 100 | 150 | 230 | 140 | 140 | 140 |
| Width at top Lt ($\mu$m) | 15 | — | 35 | 31 | 27 | 25 |
| L90 ($\mu$m) | — | 25 | — | — | — | — |
| Width Lh ($\mu$m) | 17 | 38 | 47 | 33 | 27 | 27 |
| L10 (pm) | — | 57 | — | — | — | — |
| Width at bottom Lb ($\mu$m) | 21 | — | 58 | 54 | 50 | 50 |
| Deflection Ld ($\mu$m) | 16 | 25 | 40 | 34 | 30 | 27 |
| Lt/Lh | 0.88 | — | 0.74 | 0.94 | 1 | 0.93 |
| L90/Lh | — | 0.66 | — | — | — | — |

TABLE 3-2-continued

| Results | | | | | | |
|---|---|---|---|---|---|---|
| Lb/Lh | 1.23 | — | 1.23 | 1.64 | 1.85 | 1.85 |
| L10/Lh | — | 1.5 | — | — | — | — |
| Ld/Lt | 1.07 | — | 1.14 | 1.10 | 1.11 | 1.08 |
| Ld/L90 | — | 1.0 | — | — | — | — |
| Height of barrier ribs (μm) | 117 | 137 | 165 | 145 | 120 | 130 |
| Radius of curvature (μm) | — | — | — | — | — | — |
| Lh/2 (μm) | — | — | — | — | — | — |
| Defects of barrier ribs before firing | ○ | ○ | ○ | ○ | ○ | ○ |
| Defects of barrier ribs after firing | ○ | ○ | ○ | ○ | ○ | ○ |
| Defects of phosphor coating | ○ | ○ | ○ | ○ | ○ | ○ |
| Open width ratio | 0.85 | 0.75 | 0.82 | 0.76 | 0.81 | 0.81 |
| Thickness of buffer layer (μm) | 7 | 7 | 7 | 7 | 7 | 7 |
| Porosity (%) | 2 | 2.3 | 2.6 | 1.7 | 1.3 | 1.8 |
| Light emission characteristics | ○ | ○ | ○ | ○ | ○ | ○ |

| | Example 19 | Example 20 | Example 21 | Example 22 | Example 23 | Example 24 |
|---|---|---|---|---|---|---|
| Form | FIG. 2 | FIG. 6 | FIG. 6 | FIG. 6 | FIG. 6 | FIG. 6 |
| Pitch (μm) | 150 | 150 | 150 | 150 | 230 | 150 |
| Width at top Lt (μm) | 23 | 28 | 25 | 21 | 40 | 37 |
| L90 (μm) | — | — | — | — | — | — |
| Width Lh (μm) | 25 | 28 | 29 | 23 | 45 | 40 |
| L10 (pm) | — | — | — | — | — | — |
| Width at bottom Lb (μm) | 40 | 37 | 44 | 38 | 80 | 72 |
| Deflection Ld (μm) | 24 | 32 | 27 | 24 | 42 | 40 |
| Lt/Lh | 0.92 | 1.0 | 0.86 | 0.91 | 0.89 | 0.93 |
| L90/Lh | — | — | — | — | — | — |
| Lb/Lh | 1.6 | 1.32 | 1.52 | 1.65 | 1.78 | 1.8 |
| L10/Lh | — | — | — | — | — | — |
| Ld/Lt | 1.04 | 1.14 | 1.08 | 1.14 | 1.05 | 1.08 |
| Ld/L90 | — | — | — | — | — | — |
| Height of barrier ribs (μm) | 75 | 115 | 105 | 107 | 160 | 94 |
| Radius of curvature (μm) | — | — | — | — | — | — |
| Lh/2 (μm) | — | — | — | — | — | — |
| Defects of barrier ribs before firing | ○ | ○ | ○ | ○ | ○ | ○ |
| Defects of barrier ribs after firing | ○ | ○ | ○ | ○ | ○ | ○ |
| Defects of phosphor coating | ○ | ○ | ○ | ○ | ○ | ○ |
| Open width ratio | 0.83 | 0.81 | 0.81 | 0.85 | 0.80 | 0.73 |
| Thickness of buffer layer (m) | 10 | 10 | 10 | 10 | 10 | 18 |
| Porosity (%) | 3 | 4.2 | 1 | 4.7 | 2.6 | 0.7 |
| Light emission characteristics | ○ | ○ | ○ | ○ | ○ | ○ |

TABLE 3-3

Figure 7:
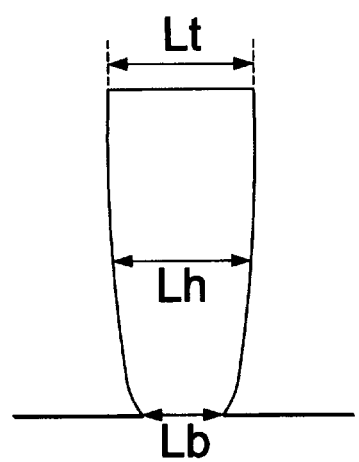

| Results | | | | | | |
|---|---|---|---|---|---|---|
| | Comparative Example 1 | Comparative Example 2 | Comparative Example 3 | Comparative Example 4 | Comparative Example 5 | Comparative Example 6 |
| Form | FIG. 7 | FIG. 8 | FIG. 4 | FIG. 7 | FIG. 3 | FIG. 2 |
| Pitch (μm) | 150 | 150 | 150 | 150 | 150 | 150 |
| Width at top Lt (μm) | 83 | — | 35 | 21 | — | 67 |
| L90 (μm) | — | 46 | — | — | 45 | — |
| Width Lh (μm) | 67 | 42 | 35 | 33 | 47 | 66 |
| L10 (μm) | — | 90 | — | — | 100 | — |
| Width at bottom Lb (μm) | 42 | — | 115 | 21 | 31 | 70 |
| Deflection Ld (μm) | 130 | 80 | 35 | 22 | 47 | 129 |
| Lt/Lh | 1.24 | — | 1.0 | 0.64 | — | 1.02 |
| L90/Lh | — | 1.10 | — | — | 0.96 | — |
| Lb/Lh | 0.63 | — | 3.28 | 0.64 | — | 1.06 |
| L10/Lh | — | 2.14 | — | — | 2.13 | — |
| Ld/Lt | 1.57 | — | 1.0 | 1.05 | — | 1.93 |
| Ld/L90 | — | 1.74 | — | — | 1.04 | — |
| Height of barrier ribs (μm) | 135 | 86 | 80 | 100 | 50 | 64 |

TABLE 3-3-continued

| | Results | | | | | |
|---|---|---|---|---|---|---|
| Radius of curvature (μm) | — | — | 40 | — | — | — |
| Lh/2 (μm) | — | — | 17.5 | — | — | — |
| Defects of barrier ribs before firing | Falling | Falling | ○ | ○ | ○ | Meandering |
| Defects of barrier ribs after firing | Peeling | Peeling | ○ | Falling | ○ | ○ |
| Defects of phosphor coating | Not coatable | Bulging out | ○ | Not coatable at bottoms | ○ | Bulging out |
| Open width ratio | 0.55 | 0.72 | 0.77 | 0.78 | 0.77 | 0.56 |
| Thickness of buffer layer (μm) | 5 | 5 | 10 | 10 | 10 | 15 |
| Porosity (%) | 2.2 | 1.7 | 3 | 1.5 | 3 | 2.7 |
| Light emission characteristics | — | Irregular luminance | Low luminance | Low luminance | Low luminance | Irregular luminance |

| | Comparative Example 7 | Comparative Example 8 | Comparative Example 9 | Comparative Example 10 |
|---|---|---|---|---|
| Form | FIG. 7 | FIG. 7 | FIG. 6 | FIG. 8 |
| Pitch (μm) | 140 | 150 | 140 | 230 |
| Width at top Lt (μm) | 48 | 25 | 46 | 42 |
| L90 (μm) | — | — | — | — |
| Width Lh (μm) | 50 | 26 | 46 | 66 |
| L10 (μm) | — | — | — | — |
| Width at bottom Lb (μm) | 40 | 20 | 100 | 42 |
| Deflection Ld (μm) | 62 | 27 | 79 | 44 |
| Lt/Lh | 0.96 | 0.96 | 1.0 | 0.64 |
| L90/Lh | — | — | — | — |
| Lb/Lh | 0.8 | 0.77 | 2.17 | 0.64 |
| L10/Lh | — | — | — | — |
| Ld/Lt | 1.29 | 1.08 | 1.72 | 1.05 |
| Ld/L90 | — | — | — | — |
| Height of barrier ribs (μm) | 69 | 67 | 120 | 124 |
| Radius of curvature (μm) | — | — | — | — |
| Lh/2 (μm) | — | — | — | — |
| Defects of barrier ribs before firing | Falling | ○ | ○ | ○ |
| Defects of barrier ribs after firing | Falling | Falling | Peeling | Falling |
| Defects of phosphor coating | Not coatable | Irregular at bottoms | Not coatable | Irregular on lateral sides |
| Open width ratio | 0.64 | 0.83 | 0.67 | 0.71 |
| Thickness of buffer layer (μm) | 7 | 7 | 0 | 5 |
| Porosity (%) | 1 | 2.5 | 32 | 1.6 |
| Light emission characteristics | — | Low luminance | — | Irregular luminance |

INDUSTRIAL APPLICABILITY

Having the barrier rib form of the present invention, falling and peeling after formation of the barrier rib pattern and the breaking and peeling of the barrier ribs after firing can be prevented. As a result, high-resolution barrier ribs can be formed. In addition, because the phosphor coatability is improved and the irregular coating and discontinuous coating of the phosphors are decreased, it becomes possible to decrease the luminance irregularity and to enhance the luminance and a high-luminance and high-resolution plasma display is provided.

We claim:

1. A plasma display having barrier ribs formed on a substrate, characterized in that the width at the top of each barrier rib (Lt), the width at the center in height (Lh) and the width at the bottom (Lb) satisfy the following formulae:

Lt/Lh=0.65 to 1

Lb/Lh=1 to 2 wherein the case of Lt=Lh=Lb is excluded.

2. A plasma display having barrier ribs formed on a substrate, characterized in that the width at 90% in height of each barrier rib (L90), the width at the center in height (Lh) and the width at 10% in height (L10) satisfy the following formulae:

L90/Lh=0.65 to 1

L10/Lh=1 to 2 wherein the case of L90=Lh=L10 is excluded.

3. A plasma display according to claim 1 or 2, characterized in that the barrier ribs are formed like stripes, and the width (L) and deflection (Ld) of the barrier ribs satisfy the following formula:

Ld/L=1 to 1.5

4. A plasma display according to claim 1 or 2, characterized in that the barrier ribs have a curved form in a region from the central portion of its height to the bottom.

5. A plasma display according to claim 1 or 2, characterized in that the width of the barrier ribs is 15 to 50 μm.

6. A plasma display according to claim 1 or 2, characterized in that the pitch of the barrier ribs is 100 to 250 μm.

7. A plasma display according to claim 1 or 2, characterized in that the pitch of the barrier ribs is 100 to 160 μm.

8. A plasma display according to claim 1 or 2, characterized in that the height of the barrier ribs is 60 to 170 μm.

9. A plasma display according to claim 8, characterized in that the height of the barrier ribs is 100 to 170 μm.

10. A plasma display according to claim 1 or 2, characterized in that the porosity of the barrier ribs is 10% or less.

11. A plasma display according to claim 10, characterized in that the porosity of the barrier ribs is 3% or less.

12. A plasma display according to claim 1 or 2, characterized in that the barrier ribs are made of a glass material having a glass transition point of 430 to 500° C., a softening point of 470 to 580° C. and a coefficient of thermal expansion ($\alpha_{50-400}$) of 50 to 90×10$^{-7}$/K.

13. A plasma display according to claim 1 or 2, characterized in that the barrier ribs contain 3 to 60 wt % of a filler having a glass transition point (Tg) of 500 to 1200° C. and a softening point (Ts) of 550 to 1200 ° C.

14. A plasma display according to claim 1 or 2, characterized in that a buffer layer is formed on the substrate and the barrier ribs are formed on the buffer layer.

15. A plasma display according to claim 14, characterized in that the thickness of the buffer layer is 3 to 20 μm.

16. A plasma display according to claim 14, characterized in that the buffer layer is made of a glass having a coefficient of thermal expansion ($\alpha_{50-400}$) of 70 to 85×10$^{-7}$/K.

17. A process for producing a plasma display described in claim 14, wherein a buffer layer is formed on a substrate and barrier ribs formed on the buffer layer, characterized in that forming a coating film to be the buffer layer made of a glass powder and an organic component on a substrate, forming a barrier rib pattern made of a glass powder and an organic component on the coating film to be the buffer layer, and firing the coating film to be the buffer layer and the barrier rib pattern simultaneously.

18. A process for producing a plasma display according to claim 17, characterized in that the coating film to be the buffer layer is made of a glass component and a photosensitive organic component.

* * * * *